(12) United States Patent
Shida

(10) Patent No.: US 10,666,886 B2
(45) Date of Patent: May 26, 2020

(54) IMAGE SENSOR, PROCESSING METHOD, AND ELECTRONIC DEVICE FOR SUPPRESSING DETERIORATION IN IMAGE QUALITY

(71) Applicant: SONY CORPORATION, Tokyo (JP)

(72) Inventor: Sayaka Shida, Kanagawa (JP)

(73) Assignee: Sony Corporation, Tokyo (JP)

( * ) Notice: Subject to any disclaimer, the term of this patent is extended or adjusted under 35 U.S.C. 154(b) by 17 days.

(21) Appl. No.: 15/557,939

(22) PCT Filed: Mar. 9, 2016

(86) PCT No.: PCT/JP2016/057277
§ 371 (c)(1),
(2) Date: Sep. 13, 2017

(87) PCT Pub. No.: WO2016/152510
PCT Pub. Date: Sep. 29, 2016

(65) Prior Publication Data
US 2018/0063458 A1 Mar. 1, 2018

(30) Foreign Application Priority Data
Mar. 23, 2015 (JP) .................................. 2015-059421

(51) Int. Cl.
*H04N 5/374* (2011.01)
*H04N 5/378* (2011.01)
(Continued)

(52) U.S. Cl.
CPC ............. *H04N 5/374* (2013.01); *H04N 5/357* (2013.01); *H04N 5/378* (2013.01); *H04N 5/3355* (2013.01)

(58) Field of Classification Search
CPC ...... H04N 5/3355; H04N 5/357; H04N 5/374; H04N 5/378; H04N 5/376
See application file for complete search history.

(56) References Cited

U.S. PATENT DOCUMENTS

| 6,119,199 A | 9/2000 | Isobe |
| 6,522,355 B1 * | 2/2003 | Hynecek ................. H04N 5/361 348/243 |

(Continued)

FOREIGN PATENT DOCUMENTS

| JP | 5-6664 A | 1/1993 |
| JP | 6-96215 A | 4/1994 |

(Continued)

OTHER PUBLICATIONS

International Search Report prepared by the Japan Patent Office dated Mar. 30, 2016, for International Application No. PCT/JP2016/057277.

*Primary Examiner* — Ngoc Yen T Vu
(74) *Attorney, Agent, or Firm* — Sheridan Ross P.C.

(57) ABSTRACT

The present technology relates to an image sensor, a processing method, and an electronic device for suppressing the deterioration of the quality of images captured by the image sensor. The image sensor includes a pixel array section configured to perform photoelectric conversion and have multiple pixels arrayed therein to output a pixel signal each; and a storage section configured to store the pixel signals output from the pixel array section. The image sensor writes and reads dummy data to and from the storage section in a non-access period other than the period in which the storage section is accessed for the writing and reading of the pixel signals thereto and therefrom. This technology may be applied to image sensors that capture images, for example.

9 Claims, 21 Drawing Sheets

(51) Int. Cl.
*H04N 5/357* (2011.01)
*H04N 5/335* (2011.01)

(56) References Cited

U.S. PATENT DOCUMENTS

| | | | | |
|---|---|---|---|---|
| 7,612,810 B2* | 11/2009 | Kokubo | ............... | H04N 5/3765 |
| | | | | 348/241 |
| 7,812,301 B2* | 10/2010 | Oike | .................... | H04N 5/3559 |
| | | | | 250/208.1 |
| 9,014,538 B2* | 4/2015 | Otani | ................... | G11B 27/005 |
| | | | | 386/224 |
| 2008/0080286 A1 | 4/2008 | Tomita | | |
| 2015/0163403 A1 | 6/2015 | Wakabayashi | | |
| 2016/0139276 A1* | 5/2016 | Naito | ................... | G01T 1/2018 |
| | | | | 250/393 |

FOREIGN PATENT DOCUMENTS

| | | | |
|---|---|---|---|
| JP | 8-307411 A | 11/1996 | |
| JP | 10-97464 A | 4/1998 | |
| JP | 2008-90904 A | 4/2008 | |
| WO | WO 2014/007004 A1 | 1/2014 | |

\* cited by examiner

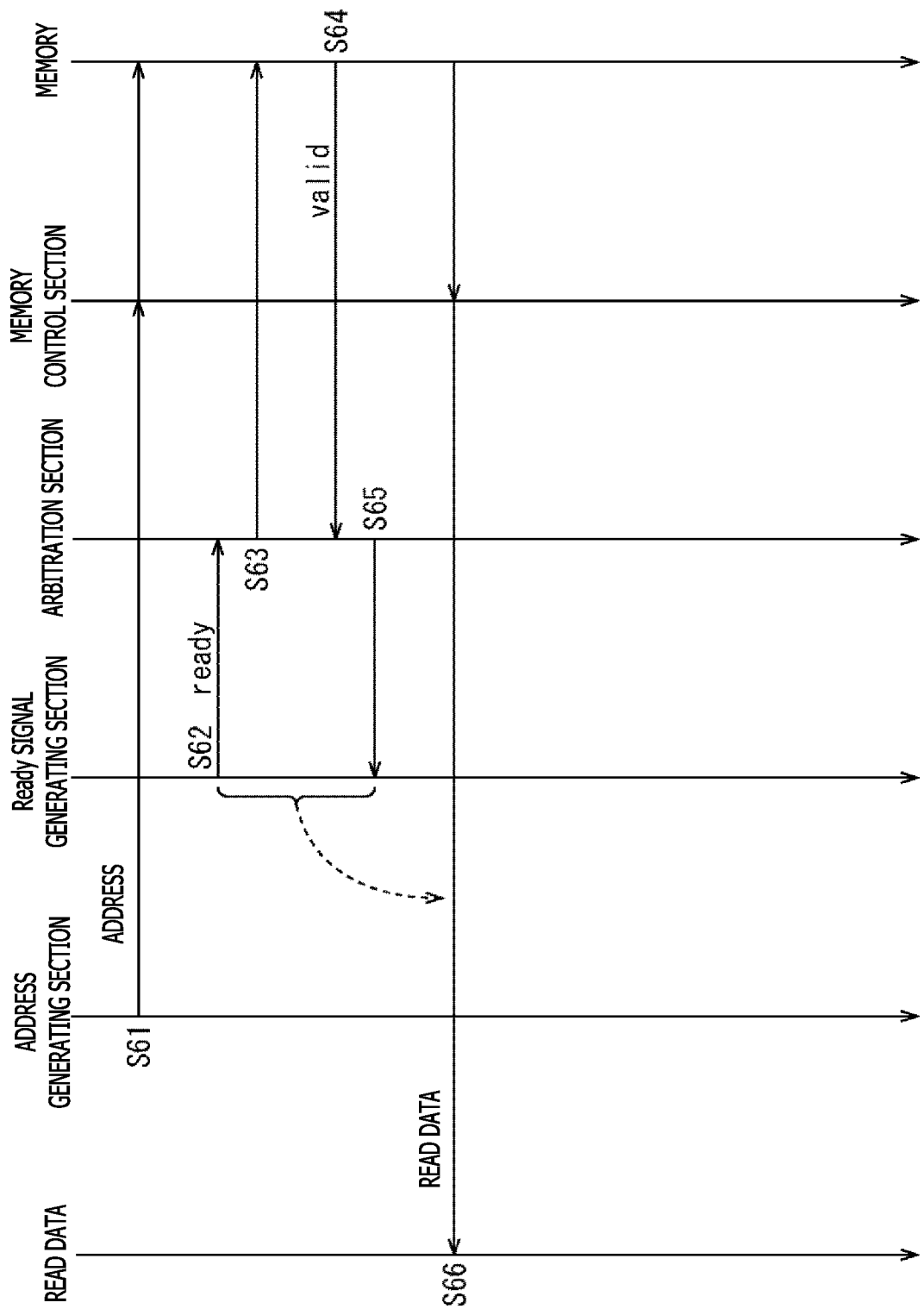
F I G . 1 5

IMAGE SENSOR, PROCESSING METHOD, AND ELECTRONIC DEVICE FOR SUPPRESSING DETERIORATION IN IMAGE QUALITY

CROSS REFERENCE TO RELATED APPLICATIONS

This application is a national stage application under 35 U.S.C. 371 and claims the benefit of PCT Application No. PCT/JP2016/057277 having an international filing date of 9 Mar. 2016, which designated the United States, which PCT application claimed the benefit of Japanese Patent Application No. 2015-059421 filed 23 Mar. 2015, the disclosures of which are incorporated herein by reference in their entirety.

TECHNICAL FIELD

The present technology relates to an image sensor, a processing method, and an electronic device. More particularly, the technology relates to an image sensor, a processing method, and an electronic device for suppressing deterioration of the quality of images captured by the image sensor.

BACKGROUND ART

In recent years, stacked image sensors have been proposed (e.g., see PTL 1).

The stacked image sensor is made up of a pixel array section, peripheral circuits, and a memory stacked one on top of the other.

The pixel array section is configured to perform photoelectric conversion and have multiple pixels arrayed therein to output a pixel signal each. The peripheral circuits perform various kinds of signal processing including analog-to-digital (AD) conversion of the pixel signals output from the pixel array section. The memory temporarily stores the result of AD conversion of the pixel signals.

CITATION LIST

Patent Literature

[PTL 1]
PCT Patent Publication No. WO2014/007004A1

SUMMARY

Technical Problem

In the case of image sensors having a memory such as stacked image sensors, a certain amount of current flows through the image sensor in a period when the memory is accessed for writing and reading of pixel signals thereto and therefrom (the period will also be called the access period hereunder).

That is, in the access period, the components such as flip-flops (FFs) constituting the circuits necessary for accessing the memory (i.e., for writing and reading of data thereto and therefrom) are toggled on and off fairly often. Because toggling of the FFs involves consuming a certain amount of current, a comparatively large current flows through the image sensor in the access period.

Meanwhile, in a period other than the access period (also called the non-access period hereunder), the FFs are barely toggled (if ever). Thus in the non-access period, the current flowing through the image sensor drops.

The pixel signals to be written to or read from the memory are dependent on the imaged object. It follows that depending on the object, the pixel signals corresponding to that object may have a period in which the signals remain virtually unchanged.

If the access period includes the period where the pixel signals written to or read from the memory vary little (the latter period will also be called the unchanging period hereunder), the FFs are barely toggled (if ever) while the pixel signals are being written to and read from the memory in the unchanging period. Thus even in the non-access period, the current flowing through the image sensor drops in the unchanging period.

As described above, the current flowing through the image sensor in a variable manner (i.e., becomes large and small repeatedly) affects AD conversion of the pixel signals. This can lead to possible insertion of noise into the result of the AD conversion of the pixel signals.

If noise is included in the result of the AD conversion of the pixel signals, the quality of images captured by the image sensor will deteriorate.

The present technology has been devised in view of the above circumstances. An object of the technology is therefore to suppress the deterioration of the quality of captured images.

Solution to Problem

According to a first aspect of the present technology, there is provided an image sensor or an electronic device having the image sensor including: a pixel array section configured to perform photoelectric conversion and have multiple pixels arrayed therein to output a pixel signal each; a storage section configured to store the pixel signals output from the pixel array section; and a control section configured to control writing and reading of the pixel signals to and from the storage section. The control section writes and reads dummy data to and from the storage section in a non-access period other than the period in which the storage section is accessed for the writing and reading of the pixel signals thereto and therefrom.

Also according to the first aspect of the present technology, there is provided a processing method for use with an image sensor including a pixel array section configured to perform photoelectric conversion and have multiple pixels arrayed therein to output a pixel signal each, a storage section configured to store the pixel signals output from the pixel array section, and a control section configured to control writing and reading of the pixel signals to and from the storage section. The processing method includes a step of causing the control section to write and read dummy data to and from the storage section in a non-access period other than the period in which the storage section is accessed for the writing and reading of the pixel signals thereto and therefrom.

With the image sensor, the processing method, and the electronic device according to the first aspect of the present technology, control is performed on the writing and reading of pixel signals to and from the storage section that stores the pixel signals output from the pixel array section configured to perform photoelectric conversion and have multiple pixels arrayed therein to output a pixel signal each. Dummy data is written and read to and from the storage section in a non-access period other than the period in which the storage section is accessed for the writing and reading of the pixel signals thereto and therefrom.

According to a second aspect of the present technology, there is provided an image sensor or an electronic device having the image sensor including: a pixel array section configured to perform photoelectric conversion and have multiple pixels arrayed therein to output a pixel signal each; a storage section configured to store the pixel signals output from the pixel array section; and a control section configured to control writing and reading of the pixel signals to and from the storage section. The control section encodes the pixel signals in such a manner as to vary the pixel signals, before writing the encoded pixel signals to the storage section.

Also according to the second aspect of the present technology, there is provided a processing method for use with an image sensor including a pixel array section configured to perform photoelectric conversion and have multiple pixels arrayed therein to output a pixel signal each, a storage section configured to store the pixel signals output from the pixel array section, and a control section configured to control writing and reading of the pixel signals to and from the storage section. The processing method includes a step of causing the control section to encode the pixel signals in such a manner as to vary the pixel signals, before writing the encoded pixel signals to the storage section.

With the image sensor, the processing method, and the electronic device according to the second aspect of the present technology, control is performed on the writing and reading of pixel signals to and from the storage section that stores the pixel signals output from the pixel array section configured to perform photoelectric conversion and have multiple pixels arrayed therein to output a pixel signal each. In the writing and reading of pixel signals, the pixel signals are encoded in such a manner that the pixel signals vary, with the encoded pixel signals written to the storage section.

According to a third aspect of the present technology, there is provided an image sensor or an electronic device having the image sensor including: a pixel array section configured to perform photoelectric conversion and have multiple pixels arrayed therein to output a pixel signal each; a storage section configured to store the pixel signals output from the pixel array section; and a control section configured to control writing and reading of the pixel signals to and from the storage section in such a manner that access operations to the storage section for the writing and reading of the pixel signals thereto and therefrom are uniformly distributed.

Also according to the third aspect of the present technology, there is provided a processing method for use with an image sensor including a pixel array section configured to perform photoelectric conversion and have multiple pixels arrayed therein to output a pixel signal each, a storage section configured to store the pixel signals output from the pixel array section, and a control section configured to control writing and reading of the pixel signals to and from the storage section. The processing method includes a step of causing the control section to control the writing and reading of the pixel signals to and from the storage section in such a manner that access operations to the storage section for the writing and reading of the pixel signals thereto and therefrom are uniformly distributed.

With the image sensor, the processing method, and the electronic device according to the third aspect of the present technology, control is performed on the writing and reading of pixel signals to and from the storage section that stores the pixel signals output from the pixel array section configured to perform photoelectric conversion and have multiple pixels arrayed therein to output a pixel signal each, the control being such that access operations to the storage section for the writing and reading of the pixel signals thereto and therefrom are uniformly distributed.

Incidentally, the image sensor may be either an independent device or an internal block constituting part of a single device.

The processing of the control section may be implemented using a program. The program may be transmitted via a transmission medium or recorded on a recording medium when offered.

Advantageous Effect of Invention

According to the present technology, the deterioration of the quality of captured images is suppressed.

The advantageous effect outlined above is only an example and not limitative of the present disclosure. Further advantages will become apparent from a reading of the present disclosure.

BRIEF DESCRIPTION OF DRAWINGS

FIG. 15 is an explanatory diagram explaining a typical reading process in which the input/output data control section 51 reads data from the memory 31.

DESCRIPTION OF EMBODIMENT (Image Sensor to which Present Technology is Applied)

Figure 1:
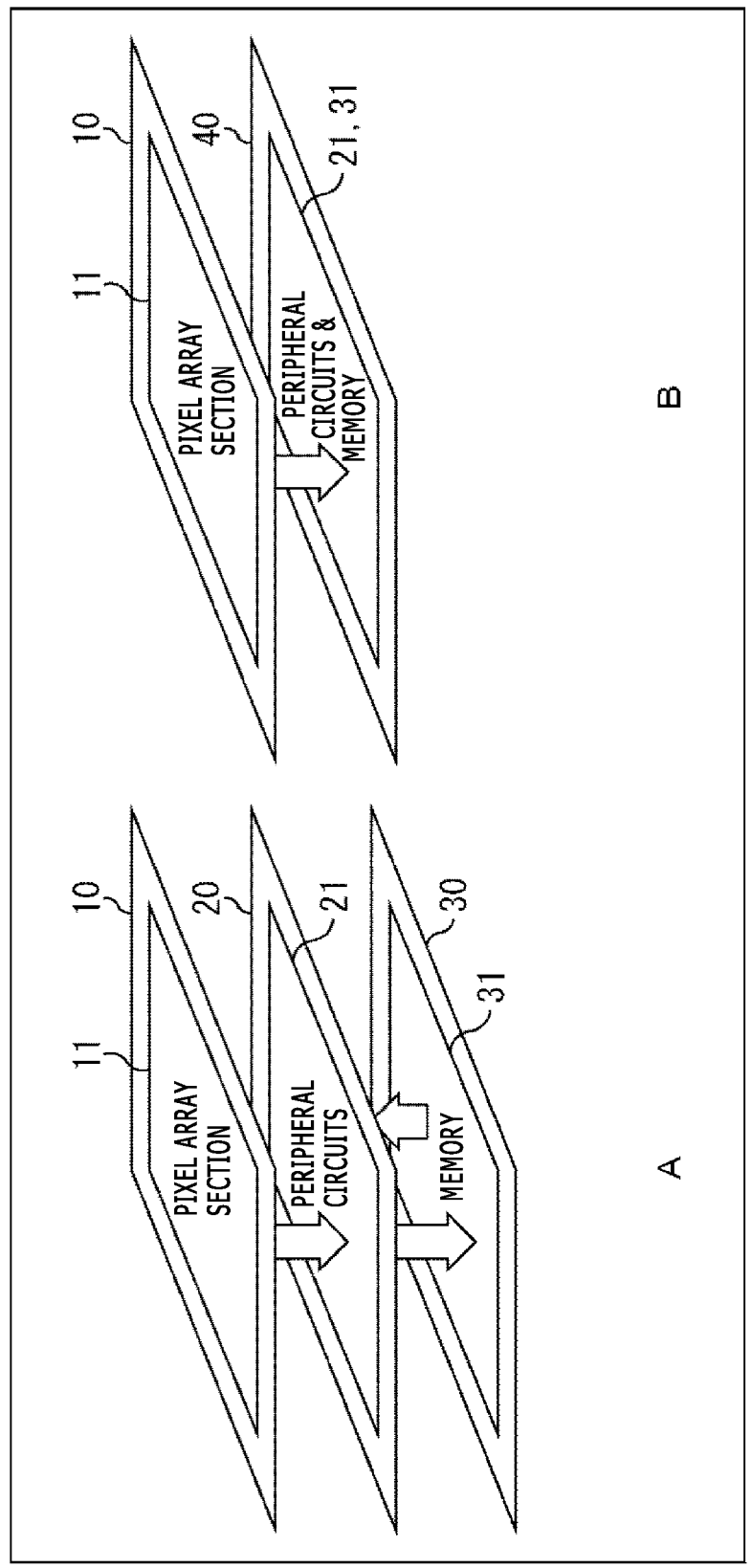
FIG. 1 is a perspective view depicting a typical external configuration of a stacked image sensor to which the present technology is applied.

FIG. 1 is a perspective view depicting a typical external configuration of a stacked image sensor to which the present technology is applied.

Specifically, Subfigure A in FIG. 1 depicts a first configuration example of the stacked image sensor.

In Subfigure A in FIG. 1, the image sensor may be a complementary metal oxide semiconductor (CMOS) image sensor, for example. This is a three-layer structure image sensor. That is, the image sensor is made up of (semiconductor) substrates 10, 20 and 30 stacked in that order from the top down.

The substrate 10 has a pixel array section 11 formed thereon. The pixel array section 11 is configured to perform photoelectric conversion and have multiple pixels (not depicted) arrayed in a matrix pattern to output a pixel signal each, for example.

The substrate 20 has peripheral circuits 21 formed thereon. The peripheral circuits 21 perform various kinds of signal processing such as AD conversion of pixel signals output from the pixel array section 11.

The substrate 30 has a memory 31 formed thereon. The memory 31 functions as a storage section that temporarily stores pixel data resulting from the AD conversion of the pixel signals output from the pixel array section 11.

Subfigure B in FIG. 1 depicts a second configuration example of the stacked image sensor.

Of the components in Subfigure B in FIG. 1, those whose corresponding counterparts are found in Subfigure A in FIG. 1 are designated by like reference numerals, and their explanations may be omitted hereunder where appropriate.

The image sensor in Subfigure B in FIG. 1, like its counterpart in Subfigure A in FIG. 1, has the substrate 10. It is to be noted, however, that the image sensor in Subfigure B in FIG. 1 differs from the image sensor in Subfigure A in FIG. 1 in that a substrate 40 is provided in place of the substrates 20 and 30.

In Subfigure B in FIG. 1, the image sensor has a two-layer structure. That is, the image sensor has the substrates 10 and 40 stacked in that order from the top down.

The substrate 40 has the peripheral circuit 21 and the memory 31 formed thereon.

Figure 2:
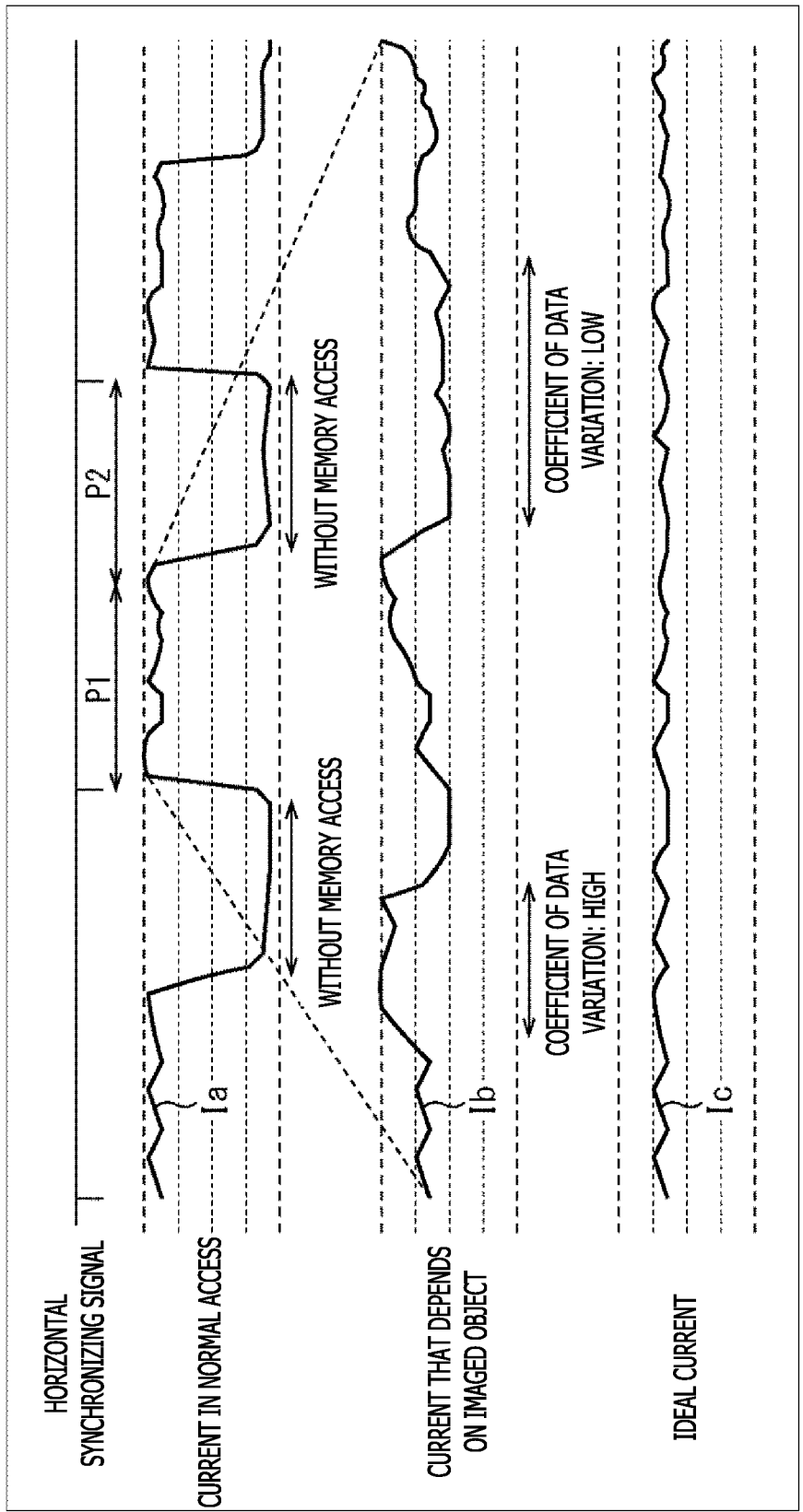
FIG. 2 is a schematic diagram depicting typical currents flowing through the image sensor.

FIG. 2 is a schematic diagram depicting typical currents flowing through the image sensor indicated in FIG. 1.

In FIG. 2, a current Ia is a current that flows through the image sensor when the memory 31 is normally accessed.

In normal memory access, pixel data obtained through AD conversion of the pixel signals from the pixel array section 11 at the start of (horizontal) lines, i.e., immediately after a horizontal synchronizing signal is started, is written consecutively to the memory 31. When, for example, the pixel data of one frame has been written to the memory 31, the one-frame pixel data written therein is read successively therefrom.

It is to be noted that writing and reading of the pixel data of one frame to and from the memory 31, for example, may be performed in less than one line period.

Thus in normal memory access, one line period is divided into two periods: an access period P1 in which the memory 31 is accessed for writing and reading of pixel data, and a non-access period P2 other than the access period P1.

In the access period P1, a fairly large current flows through the image sensor.

In the access period P1, the components such as FFs constituting the circuits necessary for accessing the memory 31 (i.e., writing and reading of data to and from the memory 31) are toggled on and off fairly often. Because toggling of the FFs involves consuming a certain amount of current, a comparatively large current flows through the image sensor in the access period P1.

In the non-access period P2, on the other hand, the FFs are barely toggled (if ever). Thus immediately after a transition from the access period P1 to the non-access period P2, the current flowing through the image sensor drops abruptly.

As described above, the current flowing through the image sensor varies significantly between the access period P1 and the non-access period P2 as indicated by the behavior of the current Ia.

The variation of the current flowing through the image sensor causes an error in the AD conversion of the pixel signals. This leads to deterioration of the quality of images captured by the image sensor.

In FIG. 2, a current Ib is a current that flows through the image sensor in a given access period P1.

Because pixel data is dependent on the imaged object, the pixel data may vary in one period and scarcely varies (if ever) in another period depending on the target object.

When the pixel data varies in the access period P1, the FFs are toggled. That means a fairly large current flows through the image sensor.

On the other hand, in a period where the pixel data remains unchanged during the access period P1, the FFs are barely toggled (if ever). That means the current flowing through the image sensor drops.

As described above, the current flowing through the image sensor may vary significantly even during the access period P1, as indicated by the behavior of the current Ib.

Also as discussed above, the variation of the current flowing through the image sensor causes an error in the AD conversion of the pixel signals. This results in the worsening of the quality of images captured by the image sensor.

In FIG. 2, a current Ic is depicted to be an ideal current flowing through the image sensor when the memory 31 is accessed.

During access to the memory 31, it is preferred that the current flowing through the image sensor vary as little as possible (i.e., with a minimum of variation), as indicated by the behavior of the current Ic.

When the current flowing through the image sensor is prevented from varying as much as possible as in the case of the current Ic, it is possible to suppress deterioration of the quality of images captured by the image sensor, the deterioration being attributable to the error taking place in the AD conversion of the pixel signals.

(First Configuration Example of Peripheral Circuits 21)

Figure 3:
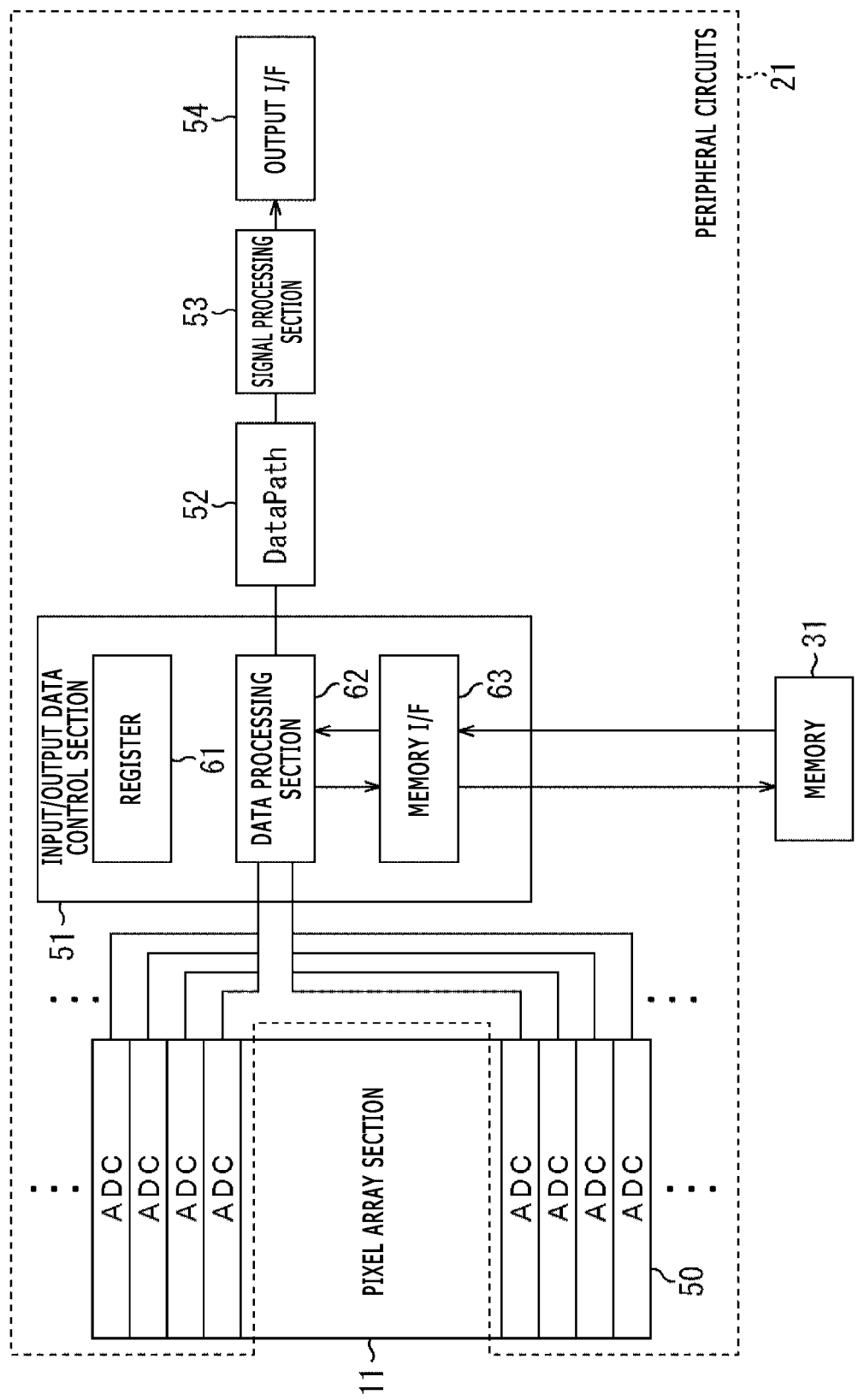
FIG. 3 is a block diagram depicting a first configuration example of peripheral circuits 21.

FIG. 3 is a block diagram depicting a first configuration example of peripheral circuits 21 in FIG. 1.

The peripheral circuits 21 include multiple AD converters (ADCs) 50, an input/output data control section 51, a data path 52, a signal processing section 53, and an output interface (I/F) 54.

There are the same number of ADCs 50 as the columns of pixels constituting the pixel array section 11. The pixel signals output from the pixels arrayed in each line (row) are subjected to parallel-column AD conversion involving parallel AD conversion of the pixel signals. The input/output data control section 51 is supplied with pixel data of a digital signal obtained per line by the ADCs 50 subjecting the pixel signals as analog signals to parallel-column AD conversion.

The input/output data control section 51 controls the writing and reading of the pixel data from the ADCs 50 to and from the memory 31. The input/output data control section 51 also controls the output of the pixel data to the data path 52.

The input/output data control section 51 includes a register 61, a data processing section 62, and a memory I/F 63.

Information with which the input/output data control section 51 controls its processing is set (recorded) to the register 61 under instructions from an external device, not depicted. In accordance with the information set in the register 61, the input/output data control section 51 performs various kinds of processing.

The data processing section 62 outputs the pixel data from the ADCs 50 directly to the data path 52.

Alternatively, the data processing section 62 may perform necessary processing on the pixel data supplied from the ADCs 50, before writing the processed pixel data to the memory 31 via the memory I/F 63.

Furthermore, the data processing section 62 reads via the memory I/F 63 the pixel data written in the memory 31, processes the retrieved pixel data from the memory 31 as needed, and outputs the processed pixel data to the data path 52.

Whether the data processing section 62 outputs the pixel data from the ADCs 50 directly to the data path 52 or writes the pixel data to the memory 31 may be selected by setting suitable information to the register 61.

Likewise, whether or not the data processing section 62 processes the pixel data fed from the ADCs 50 may be determined by setting suitable information to the register 61.

The memory I/F 63 functions as an I/F that controls writing and reading of pixel data to and from the memory 31.

The data path 52 is made up of signal lines acting as a path that feeds the pixel data output from the input/output data control section 51 to the signal processing section 53.

The signal processing section 53 performs signal processing such as black level adjustment, demosaicing, white balance adjustment, noise reduction, or developing as needed on the pixel data fed from the data path 52, before outputting the processed pixel data to the output I/F 54.

The output I/F 54 functions as an I/F that outputs the pixel data fed from the signal processing section 53 to the outside of the image sensor.

Figure 4:
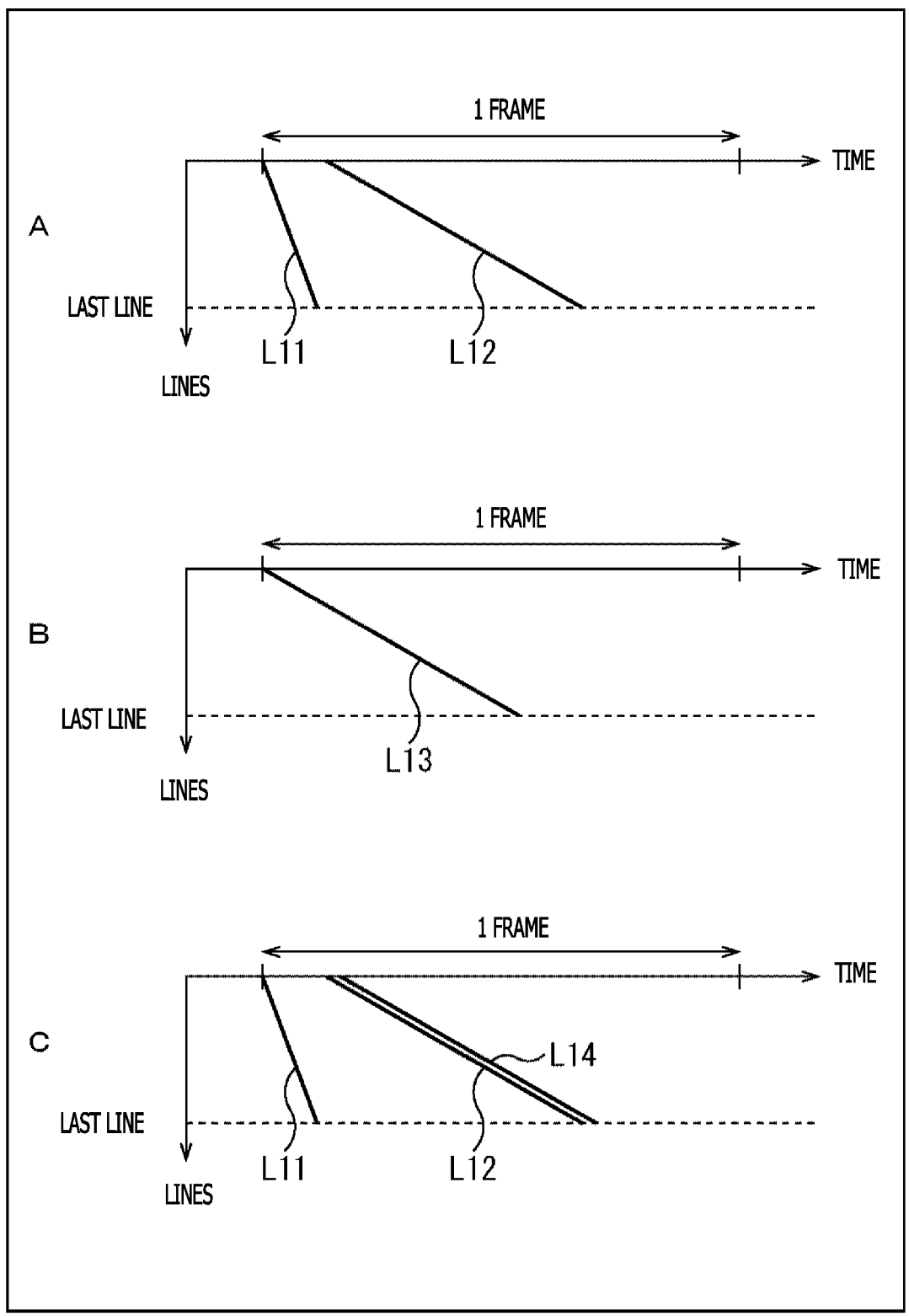
FIG. 4 is an explanatory diagram explaining how pixel data is typically handled by the peripheral circuits 21.

FIG. 4 is an explanatory diagram explaining how pixel data is typically handled by the peripheral circuits 21 in FIG. 3.

In FIG. 4, the horizontal axis denotes time, and the vertical axis represents the pixel lines making up the pixel array section 11.

Subfigure A in FIG. 4 depicts how the pixel data from the ADCs 50 is handled when it is written temporarily to the memory 31 before being output to the outside (of the image sensor).

For example, the pixel array section 11 performs photoelectric conversion at the beginning of one frame period. The pixel signals of one frame obtained through photoelectric conversion are converted through AD conversion into pixel data by the ADCs 50.

In Subfigure A in FIG. 4, the pixel data of one frame obtained through AD conversion per line by the ADCs 50 is written from the input/output data control section 51 to the memory 31 as indicated by a line segment L11. The rate at which the pixel data is written (write rate) to the memory 31 as indicated by the line segment L11 is dependent on the rate at which the ADCs 50 supply the pixel data to the input/output data control section 51, for example.

Also in Subfigure A in FIG. 4, the pixel data of one frame written to the memory 31 is read therefrom by the input/output data control section 51 as indicated by a line segment L12 and supplied to the output I/F 54 via the data path 52 and the signal processing section 53. The rate at which the pixel data is read (read rate) from the memory 31 to the output I/F 54 as indicated by the line segment L12 is dependent on the rate at which the pixel data is fed from the signal processing section 53 to the output I/F 54, for example.

Where the pixel data from the ADCs 50 is written temporarily to the memory 31 before being output to the outside as depicted in Subfigure A in FIG. 4, it is possible to suppress distortion of the image captured by the image sensor, the distortion being attributable to what is known as the focal-plane shutter.

Subfigure B in FIG. 4 depicts how the pixel data from the ADCs 50 is handled when it is output directly to the outside without being written to the memory 31.

In Subfigure B in FIG. 4, the pixel data of one frame obtained through AD conversion per line by the ADCs 50 is supplied from the input/output data control section 51 to the output I/F 54 via the data path 52 and the signal processing section 53 as indicated by a line segment L13. The rate at which the pixel data is read from the memory 31 to the output I/F 54 as indicated by the line segment L13 is dependent on the rate at which the pixel data is fed from the signal processing section 53 to the output I/F 54, as in the case indicated by the line segment L12.

Subfigure C in FIG. 4 depicts how the pixel data of one frame from the ADCs 50 is handled when it is written temporarily to the memory 31 before being output to the outside and how the pixel data of another frame from the ADCs 50 is handled when it is directly output to the outside without being written to the memory 31.

The pixel array section 11 performs photoelectric conversion (for the first time) at the beginning of one frame period as explained above with reference to Subfigure A in FIG. 4 for example. The one-frame pixel signal obtained through the photoelectric conversion is converted per line into pixel data through AD conversion by the ADCs 50.

In Subfigure C in FIG. 4, as in Subfigure A in FIG. 4, the pixel data of one frame obtained through AD conversion by the ADCs 50 is written from the input/output data control section 51 to the memory 31 as indicated by the line segment L11.

Also in Subfigure C in FIG. 4, as in Subfigure A in FIG. 4, the pixel data of one frame written to the memory 31 is read therefrom to the input/output data control section 51 as indicated by the line segment L12. The retrieved pixel data is supplied to the output I/F 54 via the data path 52 and the signal processing section 53.

Meanwhile, after the pixel data of one frame obtained through photoelectric conversion at the beginning of one frame period is written to the memory 31 as indicated by the line segment L11, the pixel array section 11 performs photoelectric conversion for the second time as depicted in Subfigure C in FIG. 4. The pixel signal of the second one frame obtained through the second-time photoelectric conversion is converted into pixel data per line through AD conversion by the ADCs 50.

Also in Subfigure C in FIG. 4, the pixel data of the second one frame obtained through AD conversion by the ADCs 50 is supplied from the input/output data control section 51 to the output I/F 54 via the data path 52 and the signal processing section 53 as indicated by a line segment L14. The rate at which the pixel data is read from the memory 31 to the output I/F 54 as indicated by the line segment L14 is dependent on the rate at which the pixel data is supplied from the signal processing section 53 to the output I/F 54, as in the case indicated by the line segment L12.

In the case of Subfigure C in FIG. 4, the pixel data of multiple frames with different exposure times may be obtained in the one-frame period for example. The pixel data of such multiple frames may be composed as needed into an image of high quality.

Incidentally, the pixel data to be written to and read from the memory 31 is the pixel data of so-called effective pixels that are displayed on a screen, for example. No further mention will be made of the effective pixels hereunder.

(First Configuration Example of Input/Output Data Control Section 51)

Figure 5:
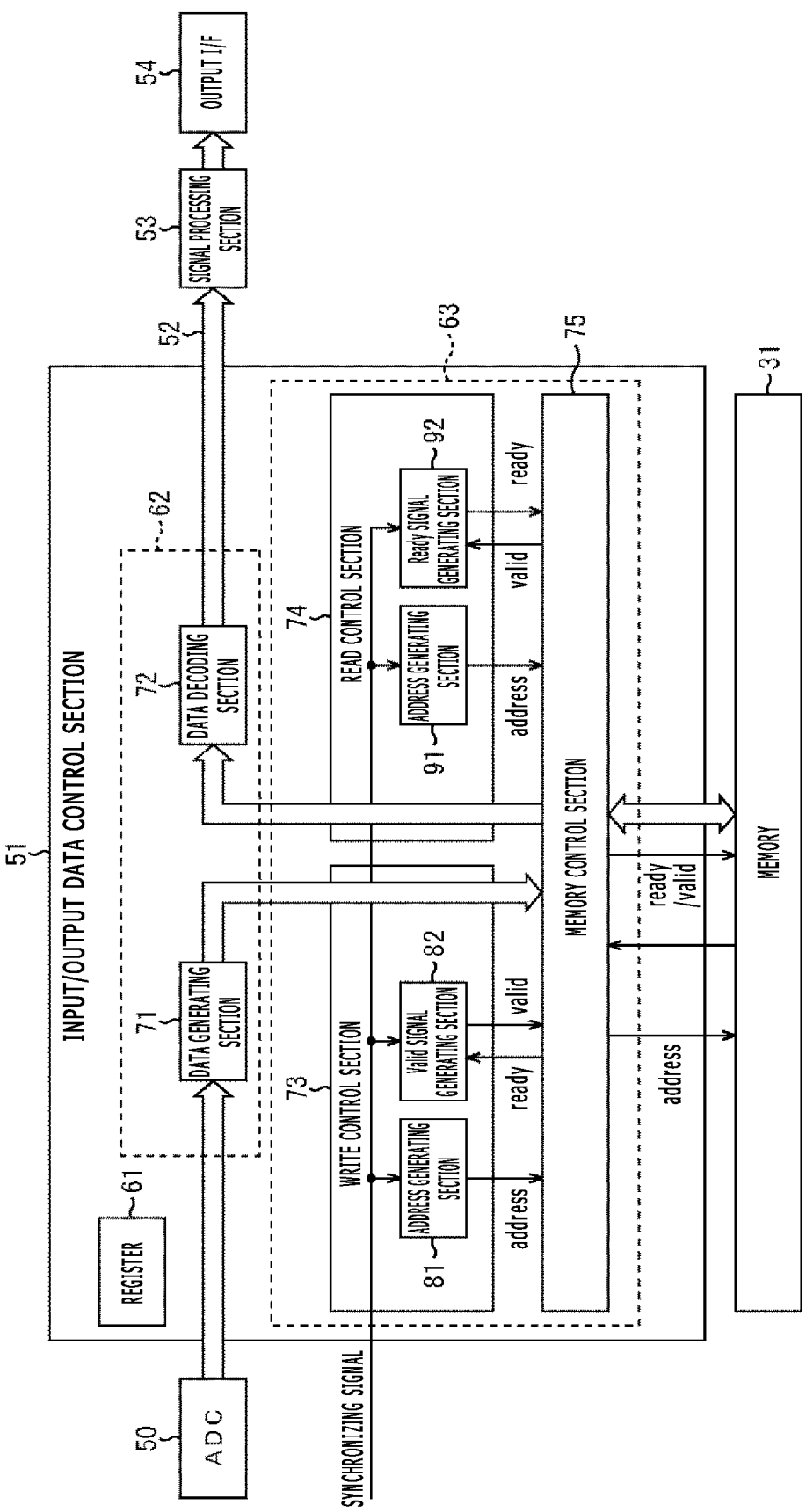
FIG. 5 is a block diagram depicting a first configuration example of an input/output data control section 51.

FIG. 5 is a block diagram depicting a first configuration example of the input/output data control section 51 in FIG. 3.

In FIG. 5, the data processing section 62 in the input/output data control section 51 includes a data generating section 71 and a data decoding section 72.

The memory I/F 63 in the input/output data control section 51 includes a write control section 73, a read control section 74, and a memory control section 75.

The data generating section 71 is supplied with pixel data from the ADCs 50.

If the register 61 is set so as to have pixel data written to the memory 31, the data generating section 71, supplied with the pixel data from the ADCs 50, forwards the supplied pixel data to the memory control section 75 via the write control section 73. The memory control section 75 writes the pixel data to the memory 31.

In a period ranging from the time the pixel data of one line is written to the memory 31 to the time the pixel data of the next one line is supplied from the ADCs 50, the data generating section 71 causes dummy data to be written to the memory 31. That is, the data generating section 71 generates dummy data and feeds the generated dummy data to the memory control section 75 via the write control section 73. The memory control section 75 writes the dummy data to the memory 31.

As described above in reference to FIG. 3, the ADCs 50 supply pixel data line by line. Thus after supplying the memory control section 75 with the pixel data of one line from the ADCs 50, the data generating section 71 feeds dummy data to the memory control section 75 until the pixel data of the next one line is supplied from the ADCs 50.

As a result, the pixel data of one line is written to the memory 31 followed by the dummy data being written thereto, and the process is repeated.

The data decoding section 72 is supplied with the data read from the memory 31 by the memory control section 75, the data being forwarded via the read control section 74.

As discussed above, the pixel data of one line is written to the memory 31 followed by the dummy data being written thereto, and the process is repeated. That means the data read from the memory 31 is made up of the pixel data of one line and subsequent dummy data being alternated one after another.

The data decoding section 72 deletes the dummy data from the alternated data, thereby decoding the alternated data into the initial pixel data. The data decoding section 72 outputs the decoded pixel data to the data path 52.

As described above, the data generating section 71 supplies the memory control section 75 with the pixel data of one line and dummy data alternately. The dummy data is thus written to and read from the memory 31 in the non-access period other than the access period in which the memory 31 is accessed for writing and reading of pixel data thereto and therefrom.

The write control section 73 controls the writing of data to the memory 31 by generating signals necessary for the write operation on the memory 31.

The write control section 73 includes an address generating section 81 and a Valid signal generating section 82.

The address generating section 81 generates a write address of the memory 31 to which to write data in synchronism with a synchronizing signal. The address generating section 81 feeds the generated write address to the memory control section 75.

The Valid signal generating section 82 generates a valid signal (also called the write valid signal hereunder) in synchronism with the synchronizing signal, the valid signal enabling the writing of data to the memory 31. The Valid signal generating section 82 feeds the generated valid signal to the memory 31 via the memory control section 75.

When preparation is ready for writing, the memory 31 outputs a ready signal (also called the write ready signal hereunder) indicating that the memory 31 is ready for a write operation in response to the write valid signal. The write ready signal output from the memory 31 is fed to the Valid signal generating section 82 via the memory control section 75.

When the Valid signal generating section 82 receives the write ready signal in response to the write valid signal, the write control section 73 supplies the memory control section 75 with the data (pixel data or dummy data) from the data generating section 71. The memory control section 75 writes the supplied data to the write address of the memory 31 fed from the address generating section 81.

The read control section 74 controls reading of data from the memory 31 by generating signals necessary for the read operation on the memory 31.

The read control section 74 includes an address generating section 91 and a Ready signal generating section 92.

The address generating section 91 generates a read address in synchronism with the synchronizing signal, the generated read address designating the address of the memory 31 from which to read data. The address generating section 91 feeds the generated read address to the memory control section 75.

The Ready signal generating section 92 generates a ready signal (also called the read ready signal hereunder) in synchronism with the synchronizing signal, the ready signal indicating that preparation is ready for the reading of data from the memory 31. The Ready signal generating section 92 feeds the generated ready signal to the memory 31 via the memory control section 75.

When it is valid (enabled) to read data, the memory 31 outputs a valid signal (also called the read valid signal hereunder) in response to the read ready signal, the valid signal indicating that the reading of data is valid. The read valid signal output from the memory 31 is fed to the Ready signal generating section 92 via the memory control section 75.

When the Ready signal generating section 92 receives the read valid signal in response to the read ready signal, the read control section 74 receives via the memory control section 75 the data (pixel data or dummy data) read from the read address of the memory 31 generated by the address generating section 91. The read control section 74 feeds the received data to the data decoding section 72.

The memory control section 75 arbitrates exchanges of the write address, ready signal, valid signal, and data to be written to the write address between the write control section 73 and the memory 31. The memory control section 75 also arbitrates exchanges of the read address, ready signal, valid signal, and data read from the read address between the read control section 74 and the memory 31.

(Writing Process)

Figure 6:
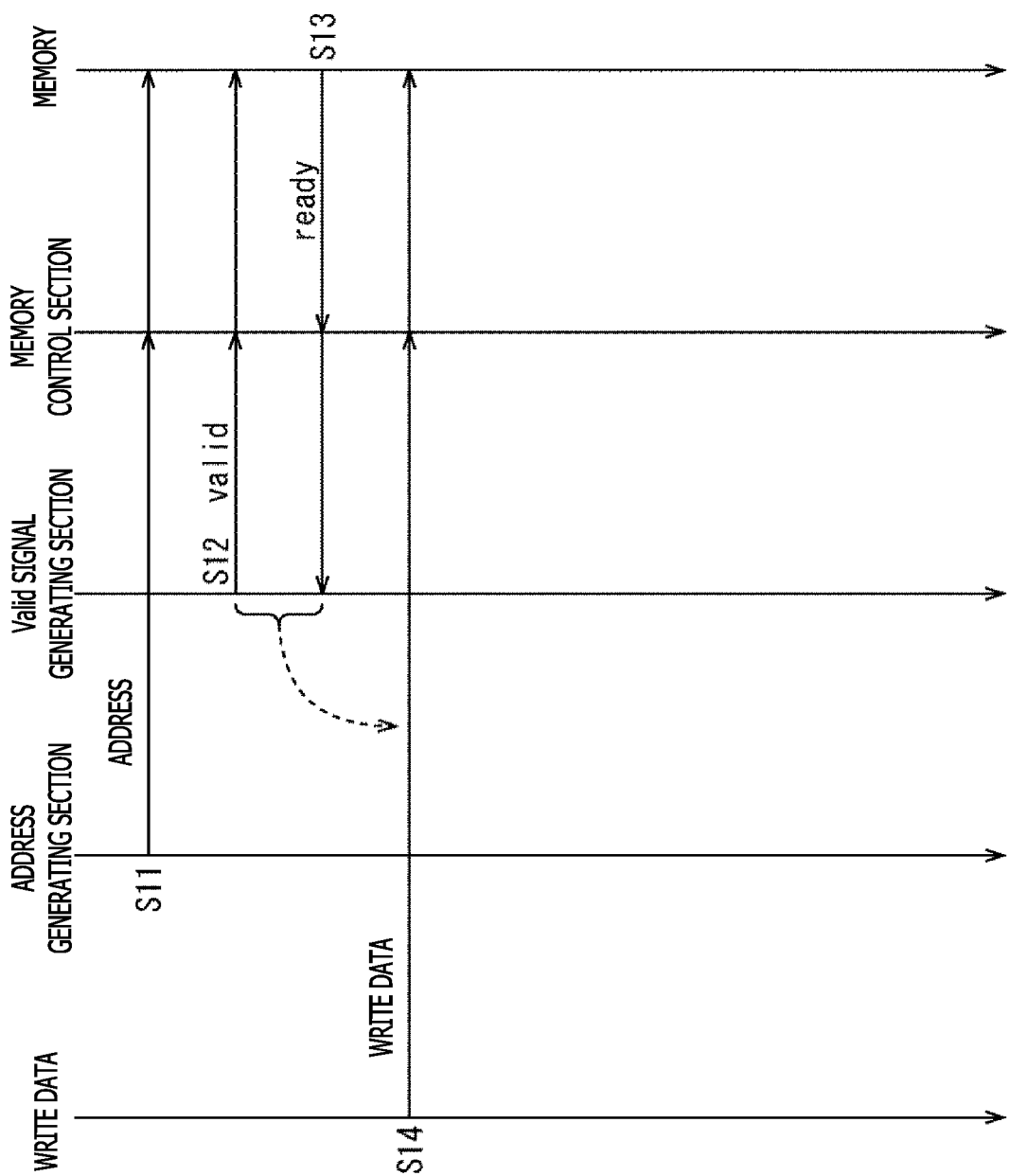
FIG. 6 is an explanatory diagram explaining a typical writing process in which the input/output data control section 51 writes data to a memory 31.

FIG. 6 is an explanatory diagram explaining a typical writing process in which the input/output data control section 51 in FIG. 5 writes data to the memory 31.

In step S11, the address generating section 81 generates a write address and feeds it to the memory 31 via the memory control section 75.

In step S12, the Valid signal generating section 82 generates a valid signal and feeds it to the memory 31 via the memory control section 75.

When preparation is ready for writing, the memory 31 in step S13 outputs a ready signal in response to the valid signal from the Valid signal generating section 82. The ready signal is fed to the Valid signal generating section 82 via the memory control section 75.

When the Valid signal generating section 82 receives the ready signal in response to the valid signal generated in step S12, the write control section 73 supplies the memory 31 with the data to be written thereto via the memory control section 75, the data being fed from the data generating section 71.

Thus in step S14, the supplied data is written to the write address of the memory 31 that was fed from the address generating section 81.

(Reading Process)

Figure 7:
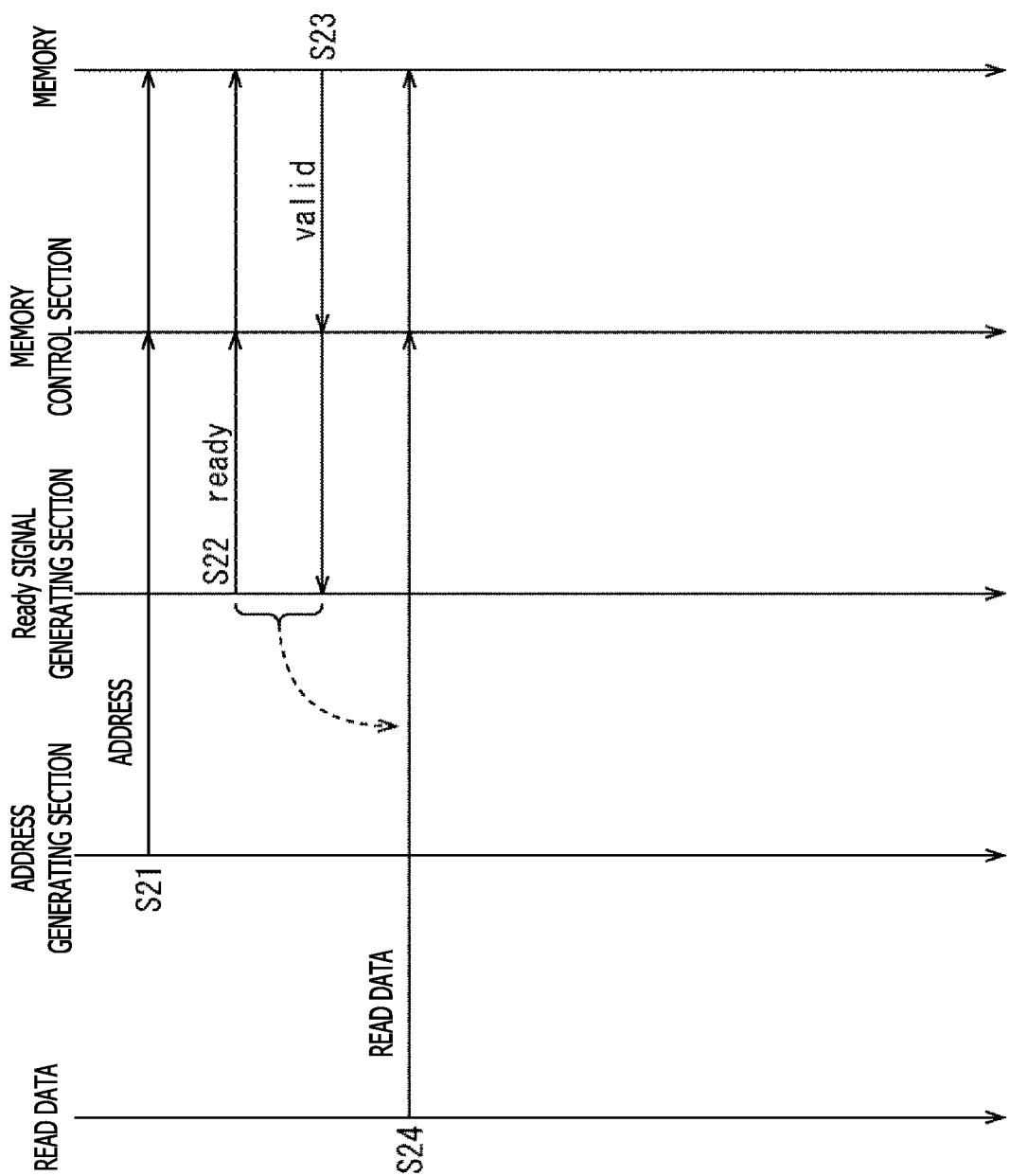
FIG. 7 is an explanatory diagram explaining a typical reading process in which the input/output data control section 51 reads data from the memory 31.

FIG. 7 is an explanatory diagram explaining a typical reading process in which the input/output data control section 51 in FIG. 5 reads data from the memory 31.

In step S21, the address generating section 91 generates a read address and feeds it to the memory 31 via the memory control section 75.

In step S22, the Ready signal generating section 92 generates a ready signal and feeds it to the memory 31 via the memory control section 75.

When it is valid (enabled) to read data, the memory 31 in step S23 outputs a valid signal in response to the read ready signal from the Ready signal generating section 92. The valid signal is fed to the Ready signal generating section 92 via the memory control section 75.

After outputting the valid signal, the memory 31 in step S24 reads the data from the read address that was fed from the address generating section 91. The data thus read is fed to the read control section 74 via the memory control section 75.

When the Ready signal generating section 92 receives the valid signal in response to the ready signal generated in step S22, the read control section 74 receives data from the memory 31 as the read data via the memory control section 75. The read data thus received is fed to the data decoding section 72.

(Memory Access in which Input/Output Data Control Section 51 Accesses Memory 31)

Figure 8:
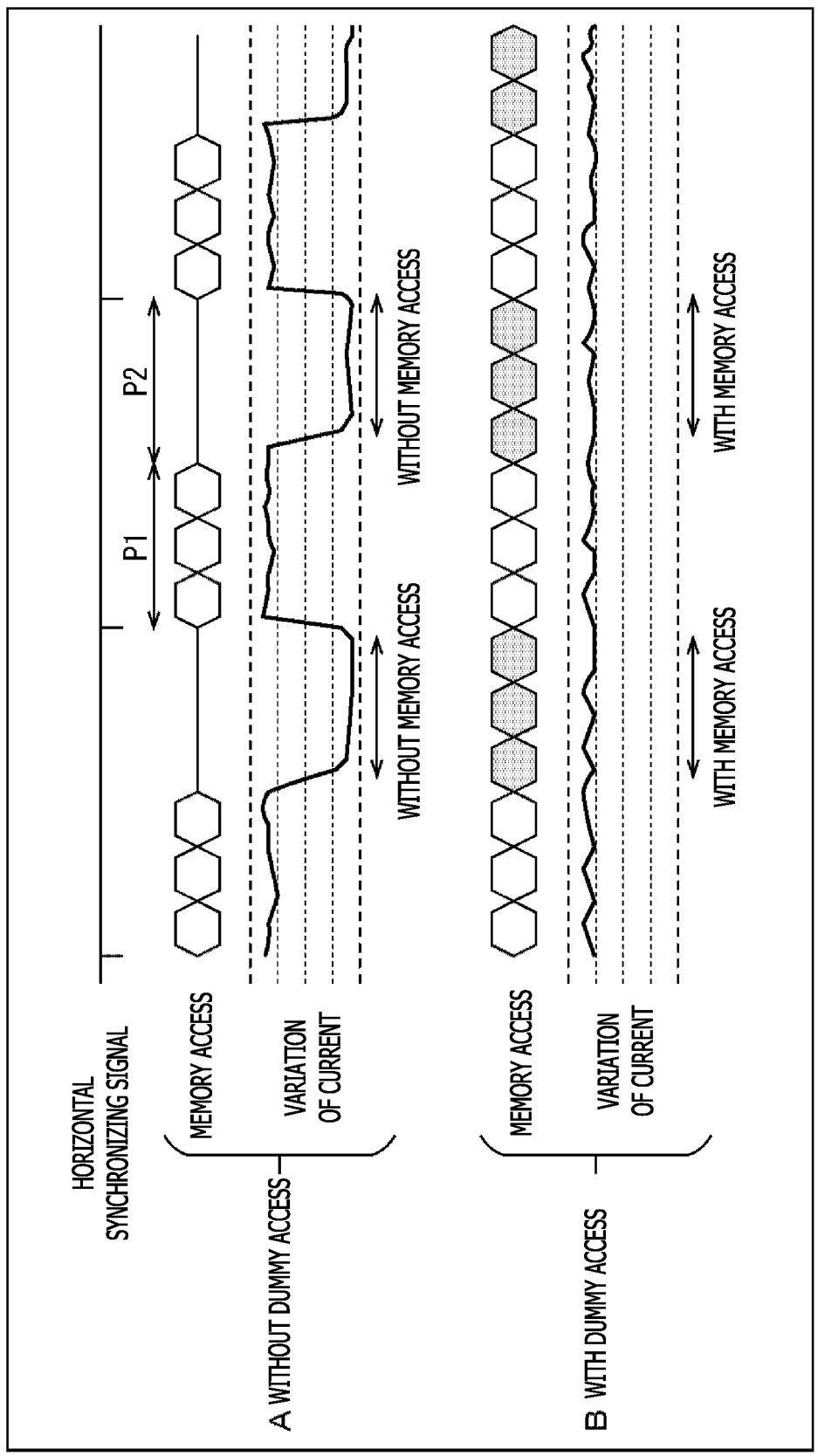
FIG. 8 is an explanatory diagram explaining typical memory access in which the input/output data control section 51 accesses the memory 31.

FIG. 8 is an explanatory diagram explaining typical memory access in which the input/output data control section 51 in FIG. 5 accesses the memory 31.

Subfigure A in FIG. 8 depicts workings of normal memory access in which dummy data is not written or read to and from the memory 31, together with the behavior of a current that flows through the image sensor in the normal memory access.

In the normal memory access, as explained above in reference to FIG. 2, the one-line period is divided into two periods: the access period P1 in which the memory 31 is accessed for writing and reading of data thereto and therefrom, and the non-access period P2 other than the access period P1.

Between the access period P1 and the non-access period P2, the current flowing through the image sensor varies significantly. That is, a fairly large current flows through the image sensor in the access period P1. In the non-access period P2, the current flowing through the image sensor drops.

The variation of the current flowing through the image sensor causes an error in the AD conversion by the ADCs 50. That in turn deteriorates the quality of images captured by the image sensor.

Subfigure B in FIG. 8 depicts workings of memory access in which dummy data is written and read to and from the memory 31 (also called the dummy access-accompanied memory access hereunder), together with the behavior of a current that flows through the image sensor in the dummy access-accompanied memory access.

In the dummy access-accompanied memory access, pixel data is written and read in the access period P1 and dummy data is written and read in the non-access period P2.

As a result, in both the access period P1 and the non-access period P2, a certain amount of current flows through the image sensor. The current flowing through the image sensor scarcely varies (if ever) throughout the access period P1 and the non-access period P2.

This makes it possible to prevent an error from occurring in the AD conversion by the ADCs 50 due to a varying current flowing through the image sensor. That in turn suppresses deterioration of the quality of images captured by the image sensor.

If the input/output data control section 51 in FIG. 5 is to perform normal memory access, then the address generating section 81, the Valid signal generating section 82, the address generating section 91, the Ready signal generating section 92, and the memory control section 75 constitute the circuits that are essential to the image sensor in FIG. 1 having the memory 31.

The image sensor in FIG. 1 may have a pattern generator mounted in the peripheral circuits 21 in order to evaluate the peripheral circuits 21 and the memory 31 before the substrate 10 having the pixel array section 11 is stacked, the pattern generator generating patterns that substitute for pixel data.

In this case, the pattern generator may be used as the data generating section 71 generating dummy data.

As described above, if the input/output data control section 51 in FIG. 5 is to perform normal memory access, the image sensor is provided with the address generating section 81, the Valid signal generating section 82, the address generating section 91, the Ready signal generating section 92, the memory control section 75, and the data generating section 71 serving as the pattern generator whether or not dummy access-accompanied memory access is conducted.

Thus the input/output data control section 51 performing dummy access-accompanied memory access may be implemented by adding the data decoding section 72 to the configuration of the image sensor in the case where normal memory access is performed.

That is, dummy access-accompanied memory access may be carried out without significantly expanding the scope of the image sensor.

In dummy access-accompanied memory access, the deterioration of the quality of captured images is suppressed as discussed above. However, more power is consumed in dummy access-accompanied memory access than in normal memory access in that as much current as in the access period P1 flows in the non-access period P2.

There is a trade-off relation between the suppression of the worsening quality of captured images and the rise in power consumption. Which alternative to choose is up to the user.

That is, whether or not to perform dummy access-accompanied memory access may be designated by setting suitable information to the register 61.

The image sensor performs either dummy access-accompanied memory access or normal memory access in accordance with the information set in the register 61.

(Second Configuration Example of Input/Output Data Control Section 51)

Figure 9:
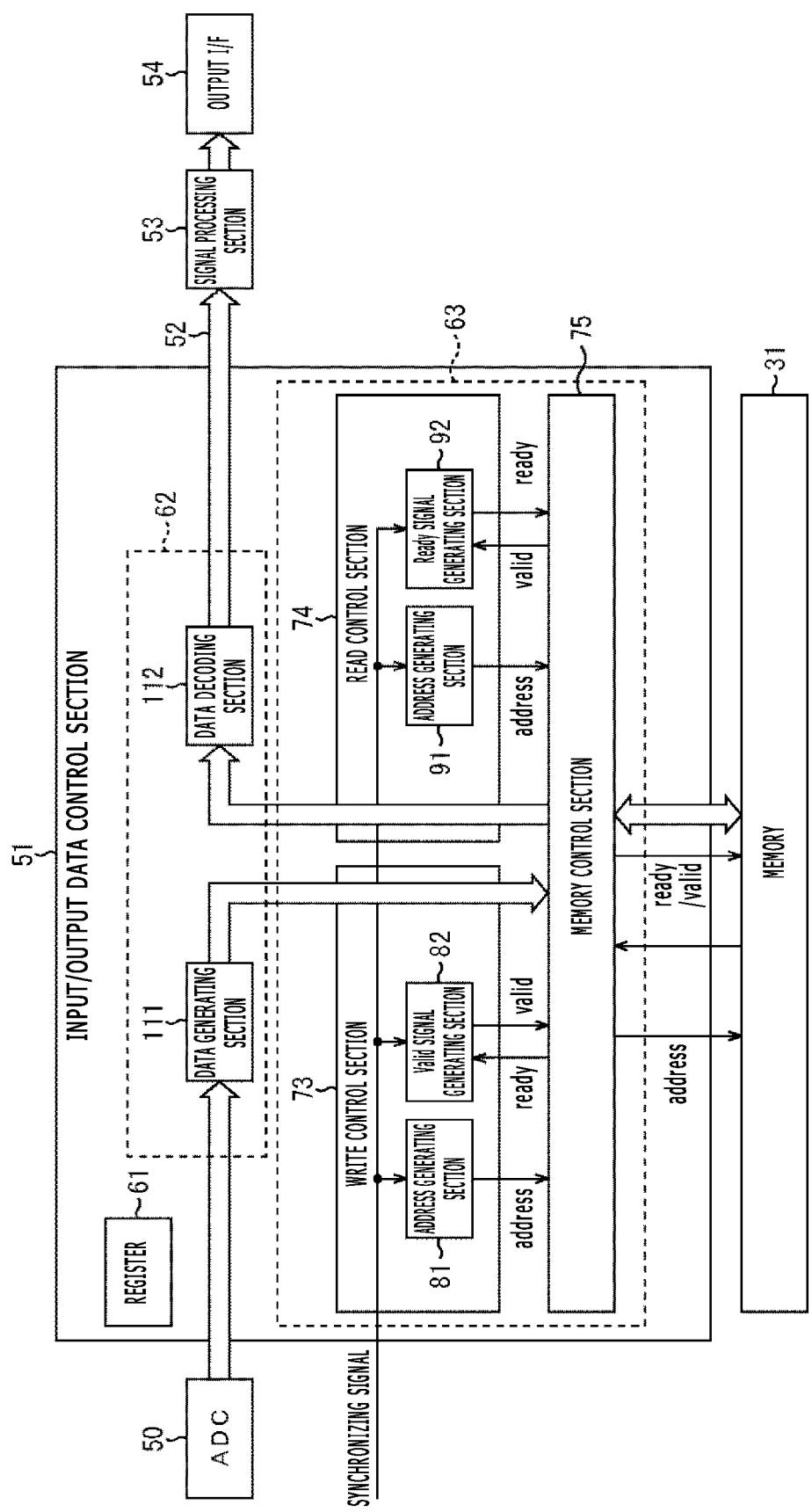
FIG. 9 is a block diagram depicting a second configuration example of the input/output data control section 51.

FIG. 9 is a block diagram depicting a second configuration example of the input/output data control section 51 in FIG. 3.

Of the components in the figure, those whose corresponding counterparts are found in FIG. 5 are designated by like reference numerals, and their explanations may be omitted hereunder where appropriate.

The input/output data control section 51 in FIG. 9 is the same as its counterpart in FIG. 5 in that the memory I/F 63 includes the write control section 73, the read control section 74, and the memory control section 75.

However, the input/output data control section 51 in FIG. 9 is different from its counterpart in FIG. 5 in that the data processing section 62 has a data generating section 111 and a data decoding section 112 replacing the data generating section 71 and the data decoding section 72 respectively.

The data generating section 111 is supplied with pixel data from the ADCs 50.

The data generating section 111 encodes a group of pixel data made up of multiple pixel data items from the ADCs 50 (i.e., pixel data from a group of pixels) in such a manner that each of the pixel data items in the pixel data group varies (as data).

In this case, a set of pixel data supplied all at once from the ADCs 50 may be used as the pixel data group, for example. If the ADCs 50 perform parallel-column AD conversion as explained above in reference to FIG. 3, the ADCs 50 provide the pixel data of one line simultaneously, for example. In this embodiment, the pixel data of one line is thus used as the pixel data group.

It is to be noted, however, that the pixel data group is not limited to the pixel data of one line.

One way for the data generating section 111 to encode the pixel data of one line in a manner causing the pixel data of that line to vary may be to use a method of performing an exclusive-OR between pixel data and predetermined patterns, for example.

Suppose that the pixel data from one pixel is made up of N bits. In this case, the data generating section 111 may generate, alternately, a pattern in which N bits are zeros and a pattern in which N bits are ones.

The data generating section 111 may then perform an exclusive-OR between the pixel data of one line and the alternately used two patterns, one with N zero-bits and the other with N one-bits. In so doing, the data generating section 111 can encode the pixel data in such a manner that the each of the pixel data items of one line varies.

The extent of how much the pixel data of one line is caused to vary (i.e., coefficient of variation) may be adjusted using suitable patterns on which an exclusive-OR is performed with pixel data.

A series of the patterns on which an exclusive-OR is performed with pixel data (the patterns may also be called the encoding patters hereunder) is not limited to what was discussed above, i.e., a series of a pattern with N zero-bits and a pattern with N one-bits being alternated.

That is, a series of a desired number of patterns each having suitable N bits may be used as the series of encoding patterns.

In this embodiment, for example, a series of the same number of patterns as that of the pixel data items of one line making up one group of pixel data (i.e., the same as the number of pixels in one line) may be generated by the data generating section 111 as the series of encoding patterns.

In this case, the series of encoding patterns is the same for the pixel data of each line.

The number of encoding patterns constituting the series of encoding patterns and the type of bit pattern in each encoding pattern may be designated by setting suitable information to the register 61, for example.

In addition to the method of performing an exclusive-OR so as to encode pixel data, the data generating section 111 may use any other suitable method for encoding the pixel data of one line in such a manner that the pixel data of that line will vary.

The data generating section 111 supplies the memory control section 75 with encoded data (encoded pixel data) obtained by an encoding operation involving calculation of an exclusive-OR between the pixel data and each encoding pattern, the encoded data being fed to the memory control section 75 via the write control section 73. The memory control section 75 writes the supplied encoded data to the memory 31.

The data decoding section 112 is supplied with the encoded data read from the memory 31 by the memory control section 75 via the read control section 74.

The data decoding section 112 decodes the encoded data into the initial pixel data, and outputs the decoded pixel data to the data path 52.

That is, the data decoding section 112 generates the same encoding patterns as those generated by the data generating section 111. The data decoding section 112 proceeds to perform an exclusive-OR between each encoding pattern thus generated and the encoded data, thereby decoding the encoded data into the initial pixel data.

Incidentally, JP 1996-307411A, for example, states that the pixel data encoded by performing an exclusive-OR with an encoding pattern is decoded into the initial pixel data by again performing an exclusive-OR with the same encoding pattern.

(Writing and Reading of Data to and from Memory 31 by Input/Output Data Control Section 51)

Figure 10:
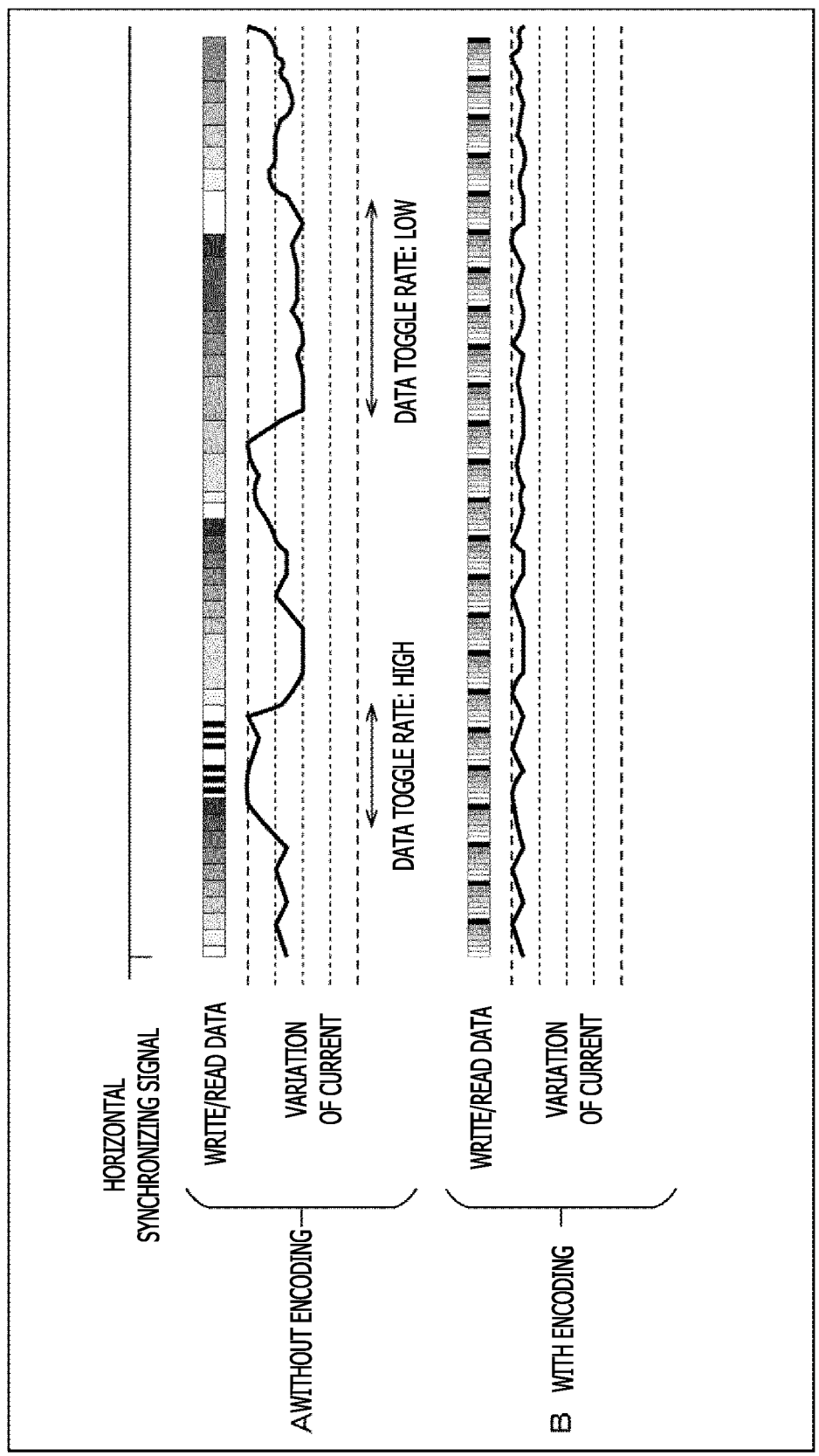
FIG. 10 is an explanatory diagram explaining how the input/output data control section 51 typically performs write and read operations on the memory 31.

FIG. 10 is an explanatory diagram explaining how the input/output data control section 51 in FIG. 9 typically performs write and read operations on the memory 31.

Subfigure A in FIG. 10 depicts workings of pixel data yet to be encoded (also called the un-encoded data hereunder), together with the behavior of a current that flows through the image sensor when the un-encoded data is written and read to and from the memory 31.

The un-encoded data, i.e., the pixel data yet to be encoded, is dependent on the imaged object as described above in reference to FIG. 2. That means two periods may occur depending on the imaged object: a period in which pixel data relatively varies, and a period in which pixel data hardly varies (if ever).

Between the period in which un-encoded data varies and the period in which un-encoded data hardly varies, the current flowing through the image sensor varies significantly. That is, in the period where un-encoded data varies, a fairly large current flows through the image sensor. In the period where un-encoded data hardly varies, the current flowing through the image sensor drops.

The variation of the current flowing through the image sensor causes an error in the AD conversion by the ADCs 50, deteriorating the quality of images captured by the image sensor.

Subfigure B in FIG. 10 depicts workings of encoded data, together with the behavior of a current that flows through the image sensor when the encoded data is written and read to and from the memory 31.

As described above in reference to FIG. 9, the data generating section 111 generates encoding patterns. The data generating section 111 also performs an exclusive-OR between the pixel data from the ADC 50 and each encoding pattern thus generated, thereby turning the pixel data into the encoded data of which the values vary.

Thus the encoded data varies continuously as depicted in Subfigure B in FIG. 10. Unlike in the case of the un-encoded data, the period with no data variation does not exist for the encoded data.

This makes it possible to suppress deterioration of the quality of images captured by the image sensor, the deterioration being attributable to an error incurred in the AD conversion by the ADCs 50 due to the variation of the current flowing through the image sensor.

If the input/output data control section 51 in FIG. 9 is to write and read un-encoded data, then the address generating section 81, the Valid signal generating section 82, the address generating section 91, the Ready signal generating section 92, and the memory control section 75 constitute the circuits that are essential to the image sensor in FIG. 1 having the memory 31.

The image sensor in FIG. 1 may have a pattern generator mounted in the peripheral circuits 21 in order to evaluate the peripheral circuits 21 and the memory 31 before the substrate 10 having the pixel array section 11 is stacked, the pattern generator generating patterns that substitute for pixel data.

In this case, the pattern generator may be used as the data generating section 111 generating encoding patterns.

As described above, if the input/output data control section 51 in FIG. 9 is to write and read un-encoded data, the image sensor is provided with the address generating section 81, the Valid signal generating section 82, the address generating section 91, the Ready signal generating section 92, the memory control section 75, and the data generating section 111 serving as the pattern generator whether or not encoded data is written and read.

Thus the input/output data control section 51 writing and reading encoded data may be implemented by adding the data decoding section 112 to the configuration of the image sensor in the case where un-encoded data is written and read.

That is, the writing and reading of encoded data may be carried out without significantly expanding the scope of the image sensor.

When encoded data is written and read, the deterioration of the quality of captured images is suppressed as discussed above. However, more power is consumed when encoded data is written and read than when un-encoded data is written and read.

There is a trade-off relation between the suppression of the worsening quality of captured images and the rise in power consumption. Which alternative to choose is up to the user.

Specifically, whether or not to write and read encoded data may be designated by setting suitable information to the register 61.

The image sensor either has the un-encoded data written and read therein or has the encoded data written and read therein in accordance with the information set in the register 61.

(Third Configuration Example of Input/Output Data Control Section 51)

Figure 11:
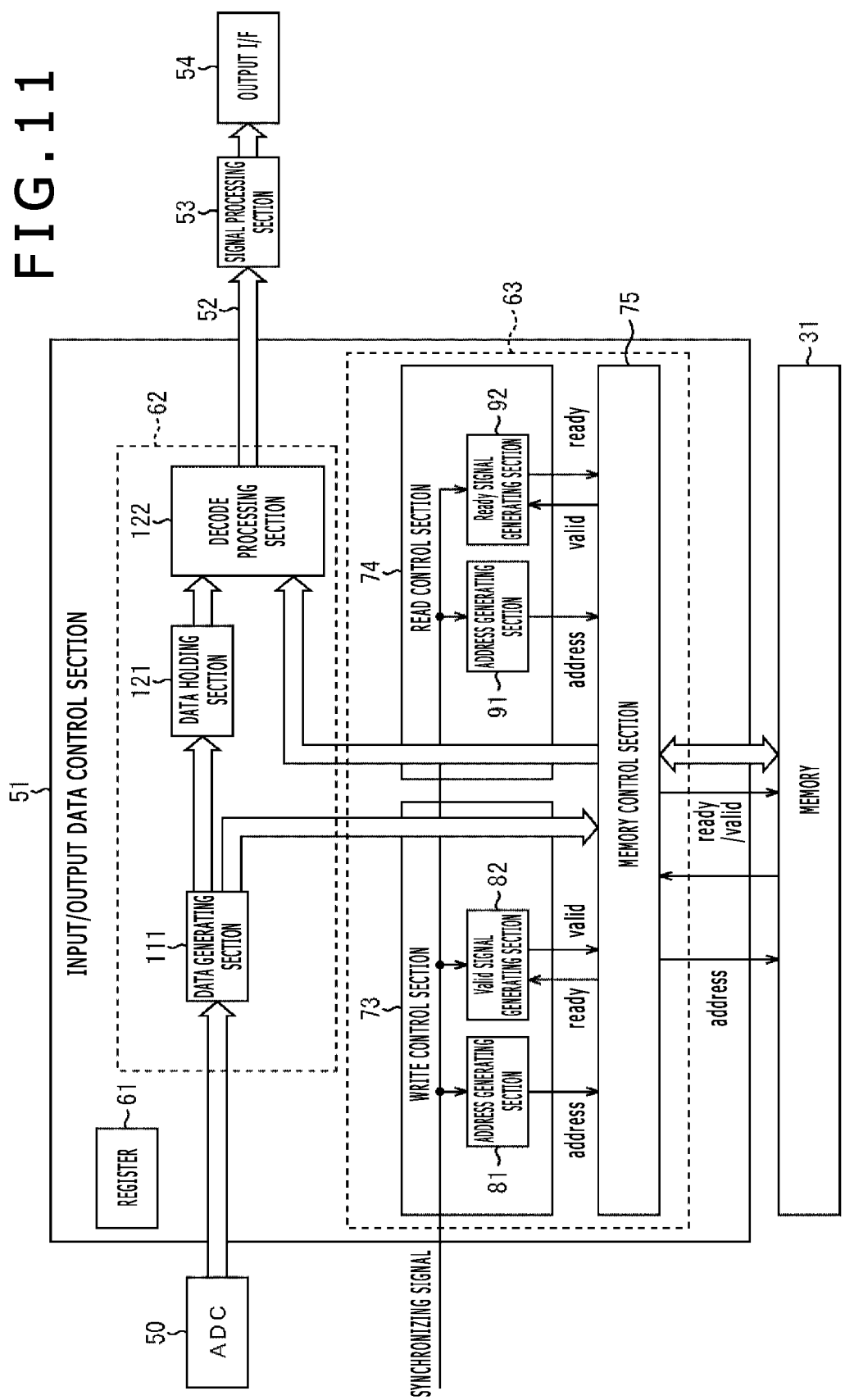
FIG. 11 is a block diagram depicting a third configuration example of the input/output data control section 51.

FIG. 11 is a block diagram depicting a third configuration example of the input/output data control section 51 in FIG. 3.

Of the components in the figure, those whose corresponding counterparts are found in FIG. 9 are designated by like reference numerals, and their explanations may be omitted hereunder where appropriate.

The input/output data control section 51 in FIG. 11 is the same as its counterpart in FIG. 9 in that the data processing section 62 includes the data generating section 111 and that the memory I/F 63 includes the write control section 73, the read control section 74, and the memory control section 75.

However, the input/output data control section 51 in FIG. 11 is different from its counterpart in FIG. 9 in that the data processing section 62 has a data holding section 121 and a decode processing section 122 replacing the data decoding section 112.

The data holding section 121 is supplied with the encoding patterns generated by the data generating section 111.

The data holding section 121 holds (stores) the encoding patterns supplied from the data generating section 111.

The decode processing section 122 performs an exclusive-OR between the encoding patterns stored in the data holding section 121 and the encoded data read from the memory 31, thereby decoding the encoded data into the initial pixel data and outputting the decoded pixel data to the data path 52. The decode processing section 122 is thus different from the data decoding section 112 in FIG. 9 generating encoding patterns in that the decode processing section 122 does not generate encoding patterns.

In the input/output data control section 51 configured as described above, each of the pixel data items of one line L supplied from the ADCs 50 is encoded in synchronism with the decoding of each of the pixel data items of another line L' read from the memory 31.

In this embodiment, as explained above in reference to FIG. 9, the series of encoding patterns is the same for the pixel data of each line. It follows that when the encoding of each of the pixel data items of the line L is carried out in synchronism with the decoding of each of the pixel data items of the line L', the encoding patterns used for the encoding and the decoding coincide with one another bit for bit.

Thus in the input/output data control section 51 in FIG. 11, the encoding patterns generated by the data generating section 111 are held successively, one bit at a time, in the data holding section 121. An exclusive-OR is performed between one bit held in the data holding section 121 and one bit of the encoded data read from the memory 31. This decodes the encoded data into the initial pixel data.

In this case, the data holding section 121 may be configured as a one-bit FF for example. Unlike the data decoding section 112 in FIG. 9, the decode processing section 122 need not be provided with the capability of generating the same encoding patterns as those generated by the data generating section 111.

The data holding section 121 and the decode processing section 122 are thus configured to be smaller than the data decoding section 112 in FIG. 9. This contributes to making the image sensor smaller in size.

(Second Configuration Example of Peripheral Circuits 21)

Figure 12:
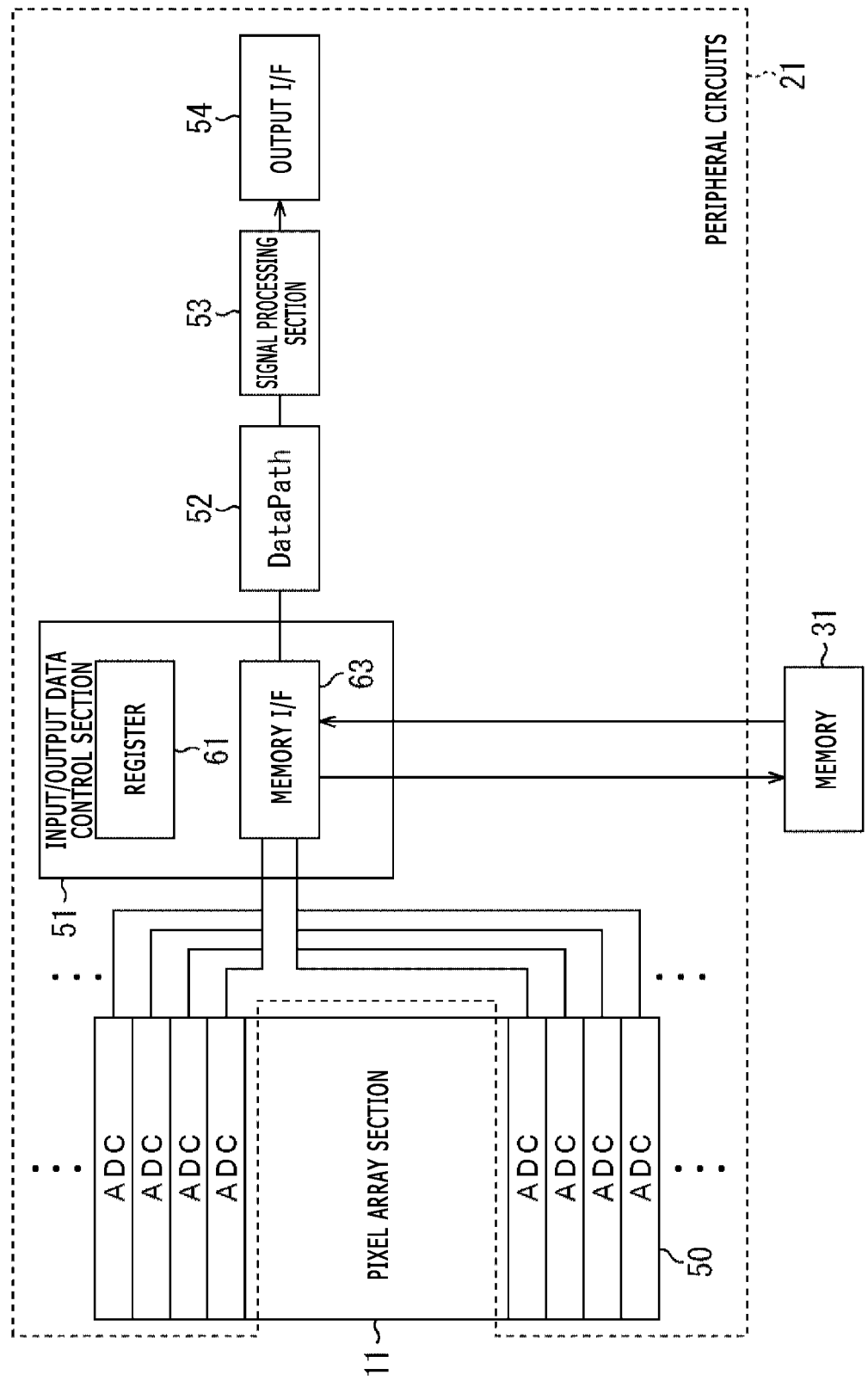
FIG. 12 is a block diagram depicting a second configuration example of the peripheral circuits 21.

FIG. 12 is a block diagram depicting a second configuration example of the peripheral circuits 21 in FIG. 1.

Of the components in the figure, those whose corresponding counterparts are found in FIG. 3 are designated by like reference numerals, and their explanations may be omitted hereunder where appropriate.

In FIG. 12, the peripheral circuits 21 are the same as its counterparts in FIG. 3 in that the peripheral circuits 21 include the ADCs 50, the input/output data control section 51, the data path 52, the signal processing section 53, and the output I/F 54.

However, the peripheral circuits 21 in FIG. 12 are different from its counterparts in FIG. 3 in that the data processing section 62 is not included in the input/output data control section 51.

(Fourth Configuration Example of Input/Output Data Control Section 51)

Figure 13:
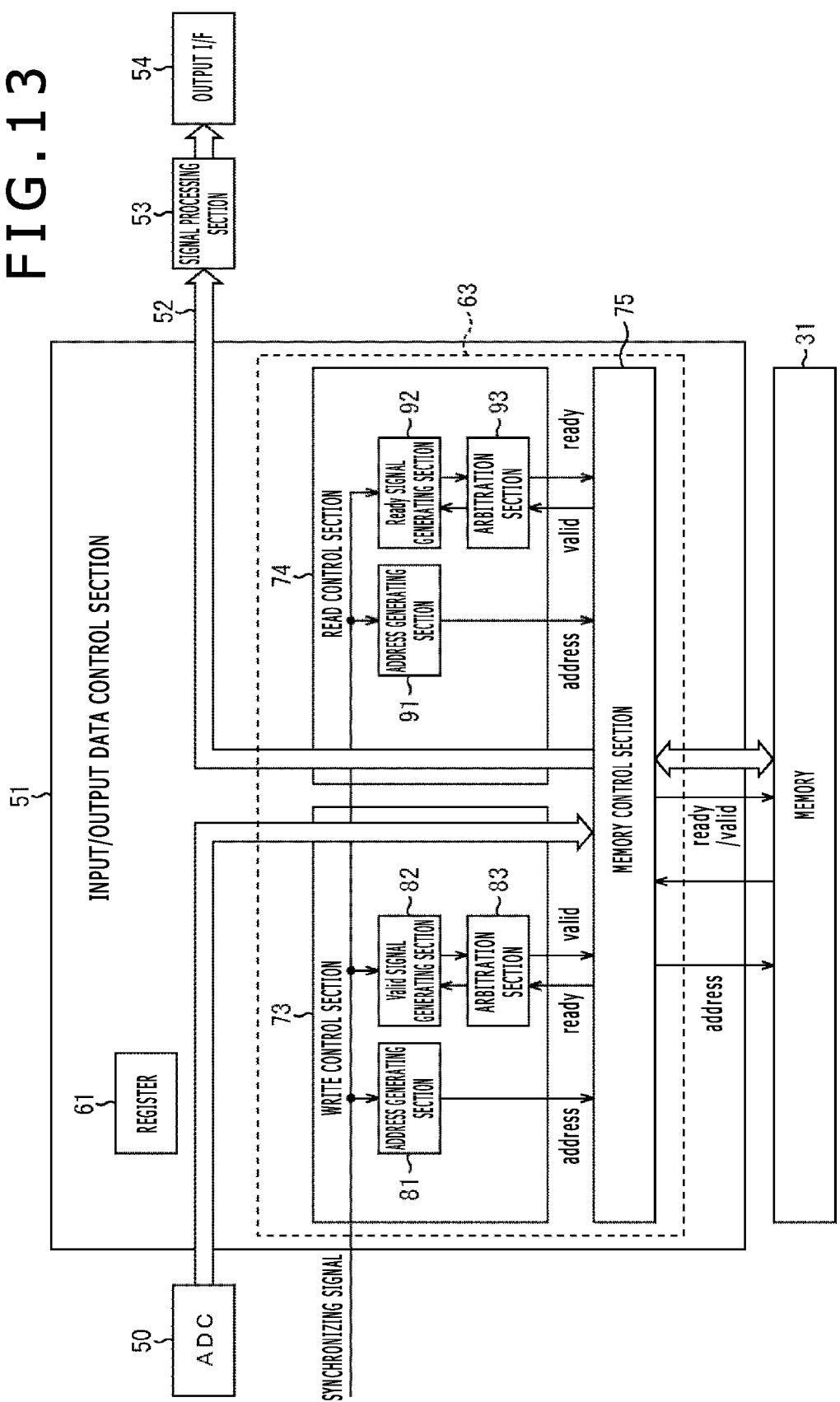
FIG. 13 is a block diagram depicting a fourth configuration example of the input/output data control section 51.

FIG. 13 is a block diagram depicting a configuration example of the input/output data control section 51 in FIG. 12.

Specifically, FIG. 13 is a block diagram depicting a fourth configuration example of the input/output data control section 51.

Of the components in the figure, those whose corresponding counterparts are found in FIG. 5 are designated by like reference numerals, and their explanations may be omitted hereunder where appropriate.

The input/output data control section 51 in FIG. 13 is the same as its counterpart in FIG. 5 in that the memory I/F 63 includes the write control section 73, the read control section 74, and the memory control section 75.

However, the input/output data control section 51 in FIG. 13 is different from its counterpart in FIG. 5 in that the data processing section 62 with its data generating section 71 and its data decoding section 72 is not provided.

The input/output data control section 51 in FIG. 13 further differs from its counterpart in FIG. 5 in that the write control section 73 includes an arbitration section 83 and the read control section 74 includes an arbitration section 93.

The arbitration section 83 is supplied with a valid signal from the Valid signal generating section 82. The arbitration section 83 is further supplied with a ready signal from the memory 31 via the memory control section 75.

The arbitration section 83 delays the valid signal from the Valid signal generating section 82 as needed, before feeding the valid signal to the memory 31 via the memory control section 75. The arbitration section 83 also delays the ready signal from the memory 31 as needed, before feeding the ready signal to the Valid signal generating section 82.

By delaying the valid signal and ready signal as described above, the arbitration section 83 arbitrates memory access for writing pixel data to the memory 31. In this manner, the arbitration section 83 controls the timing of the memory access.

The arbitration section 93 is supplied with a ready signal from the Ready signal generating section 92. The arbitration section 93 is further supplied with a valid signal from the memory 31 via the memory control section 75.

The arbitration section 93 delays the ready signal from the Ready signal generating section 92 as needed, before feeding the ready signal to the memory 31 via the memory control section 75. The arbitration section 93 also delays the valid signal from the memory 31 as needed, before feeding the valid signal to the Ready signal generating section 92.

By delaying the ready signal and valid signal as described above, the arbitration section 93 arbitrates memory access for reading pixel data from the memory 31. In this manner, the arbitration section 93 controls the timing of the memory access.

The arbitration sections 83 and 93 arbitrate memory access in such a manner that access operations to the memory 31 for writing and reading of data thereto and therefrom are distributed uniformly.

Incidentally, the arbitration of memory access may be implemented using the technology of a band-limiting filter for controlling transfer efficiency described in JP 2012-103763A.

(Writing Process)

Figure 14:
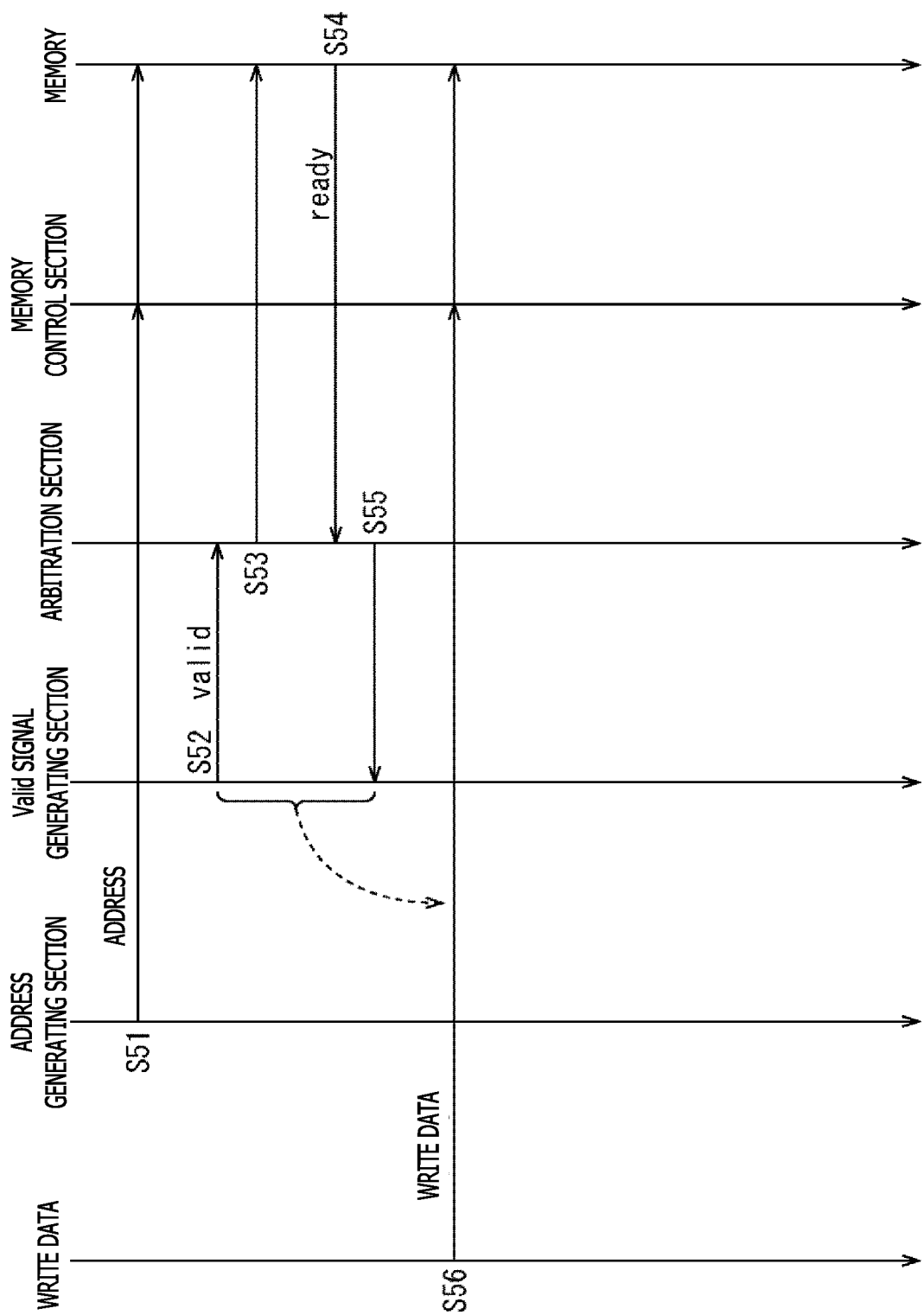
FIG. 14 is an explanatory diagram explaining a typical writing process in which the input/output data control section 51 writes data to the memory 31.

FIG. 14 is an explanatory diagram explaining a typical writing process in which the input/output data control section 51 in FIG. 13 writes data to the memory 31.

In step S51, the address generating section 81 generates a write address and feeds it to the memory 31 via the memory control section 75.

In step S52, the Valid signal generating section 82 generates a valid signal and feeds it to the arbitration section 83.

In step S53, the arbitration section 83 delays the valid signal from the Valid signal generating section 82 as needed so that access operations to the memory 31 will be uniformly distributed. The arbitration section 83 feeds the valid signal to the memory 31 via the memory control section 75.

When preparation is ready for writing, the memory 31 in step S54 outputs a ready signal in response to the valid signal from the Valid signal generating section 82. This ready signal is fed to the arbitration section 83 via the memory control section 75.

In step S55, the arbitration section 83 delays the ready signal from the memory 31 as needed so that access operations to the memory 31 will be uniformly distributed. The arbitration section 83 feeds the ready signal to the Valid signal generating section 82.

When the Valid signal generating section 82 receives the ready signal in response to the valid signal generated in step S52, the write control section 73 supplies the memory 31 with pixel data from the ADCs 50 via the memory control section 75, the pixel data being the target write data to be written to the memory 31.

In step S56, the memory 31 thus writes the target write data to the write address fed from the address generating section 81.

(Reading Process)

FIG. 15 is an explanatory diagram explaining a typical reading process in which the input/output data control section 51 in FIG. 13 reads data from the memory 31.

In step S61, the address generating section 91 generates a read address and feeds it to the memory 31 via the memory control section 75.

In step S62, the Ready signal generating section 92 generates a ready signal and feeds it to the arbitration section 93.

In step S63, the arbitration section 93 delays the ready signal from the Ready signal generating section 92 as needed so that access operations to the memory 31 will be uniformly distributed. The arbitration section 93 feeds the ready signal to the memory 31 via the memory control section 75.

When it is valid (enabled) to read data, the memory 31 in step S64 outputs a valid signal in response to the ready signal from the Ready signal generating section 92. This valid signal is fed to the arbitration section 93 via the memory control section 75.

In step S65, the arbitration section 93 delays the valid signal from the memory 31 as needed so that access operations to the memory 31 will be uniformly distributed. The arbitration section 93 feeds the valid signal to the Ready signal generating section 92.

After the valid signal is output, the memory 31 in step S66 reads data from the read address supplied from the address generating section 91, and feeds the read data to the read control section 74 via the memory control section 75.

When the Ready signal generating section 92 receives the valid signal in response to the ready signal generated in step S62, the read control section 74 at this point receives as the read data the data fed from the memory 31 via the memory control section 75, and outputs the read data to the data path 52.

Referring to FIGS. 14 and 15, either the ready signal or the valid signal alone may be delayed so that access operations to the memory 31 will be uniformly distributed.

(Access to Memory 31 by Input/Output Data Control Section 51)

Figure 16:
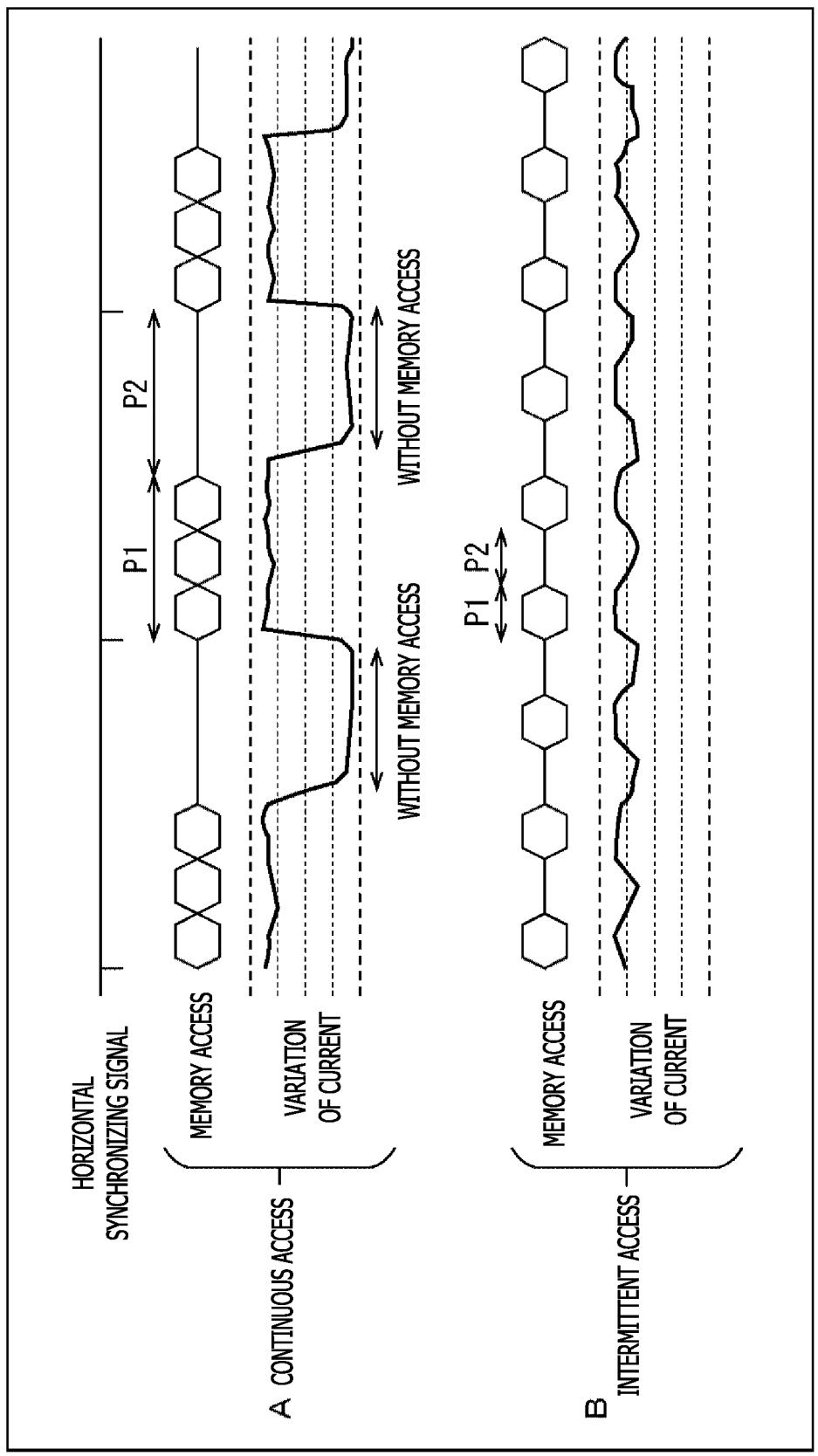
FIG. 16 is an explanatory diagram explaining how the input/output data control section 51 typically accesses the memory 31.

FIG. 16 is an explanatory diagram explaining how the input/output data control section 51 in FIG. 13 typically accesses the memory 31.

Subfigure A in FIG. 16 depicts workings of normal memory access, together with the behavior of a current flowing through the image sensor in the normal memory access.

Subfigure A in FIG. 16 is the same as Subfigure A in FIG. 8 and thus will not be discussed further.

Subfigure B in FIG. 16 depicts workings of memory access in which access operations are uniformly distributed through arbitration by the arbitration sections 83 and 93 (the access will also be called distributed memory access hereunder), together with the behavior of a current flowing through the image sensor in the case where distributed memory access is performed.

In distributed memory access, access operations to the memory 31 are distributed. That means the non-access period P2 in distributed memory access is sufficiently shorter than in normal memory access.

Because the non-access period P2 is shortened in distributed memory access, the access period P1 is entered before the current flowing through the image sensor drops significantly in the non-access period P2.

As a result, the variation of the current flowing through the image sensor in the access period P1 and in the non-access period P2 is suppressed.

This makes it possible to prevent an error from occurring in the AD conversion by the ADCs 50 due to a varying current flowing through the image sensor. That in turn suppresses the deterioration of the quality of images captured by the image sensor.

In distributed memory access, the non-access period P2, although very short, takes place. That means the current flowing through the image sensor in distributed memory access varies more than in dummy access-accompanied memory access (Subfigure B in FIG. 8). Still, a capacitor attached to the image sensor will suppress the variation of the current in distributed memory access to such an extent that the error incurred in the AD conversion by the ADCs 50 is sufficiently reduced.

If the input/output data control section 51 in FIG. 13 is to perform normal memory access, then the address generating section 81, the Valid signal generating section 82, the address generating section 91, the Ready signal generating section 92, and the memory control section 75 constitute the circuits that are essential to the image sensor in FIG. 1 having the memory 31.

That is, if the input/output data control section 51 in FIG. 13 is to perform normal memory access, the image sensor is provided with the address generating section 81, the Valid signal generating section 82, the address generating section 91, the Ready signal generating section 92, and the memory control section 75 whether or not distributed memory access is performed.

It follows that the input/output data control section 51 performing distributed memory access may be implemented by adding the arbitration sections 83 and 93 to the configuration of the image sensor in the case where normal memory access is performed.

That is, distributed memory access may be carried out without significantly expanding the scope of the image sensor.

In distributed memory access, the deterioration of the quality of captured images is suppressed as discussed above. However, more power is consumed in distributed memory access than in normal memory access.

There is a trade-off relation between the suppression of the worsening quality of captured images and the rise in power consumption. Which alternative to choose is up to the user.

That is, whether or not to perform distributed memory access may be designated by setting suitable information to the register 61.

In the image sensor, either distributed memory access or normal memory access is performed in accordance with the information set in the register 61.

(Fifth Configuration Example of Input/Output Data Control Section 51)

Figure 17:
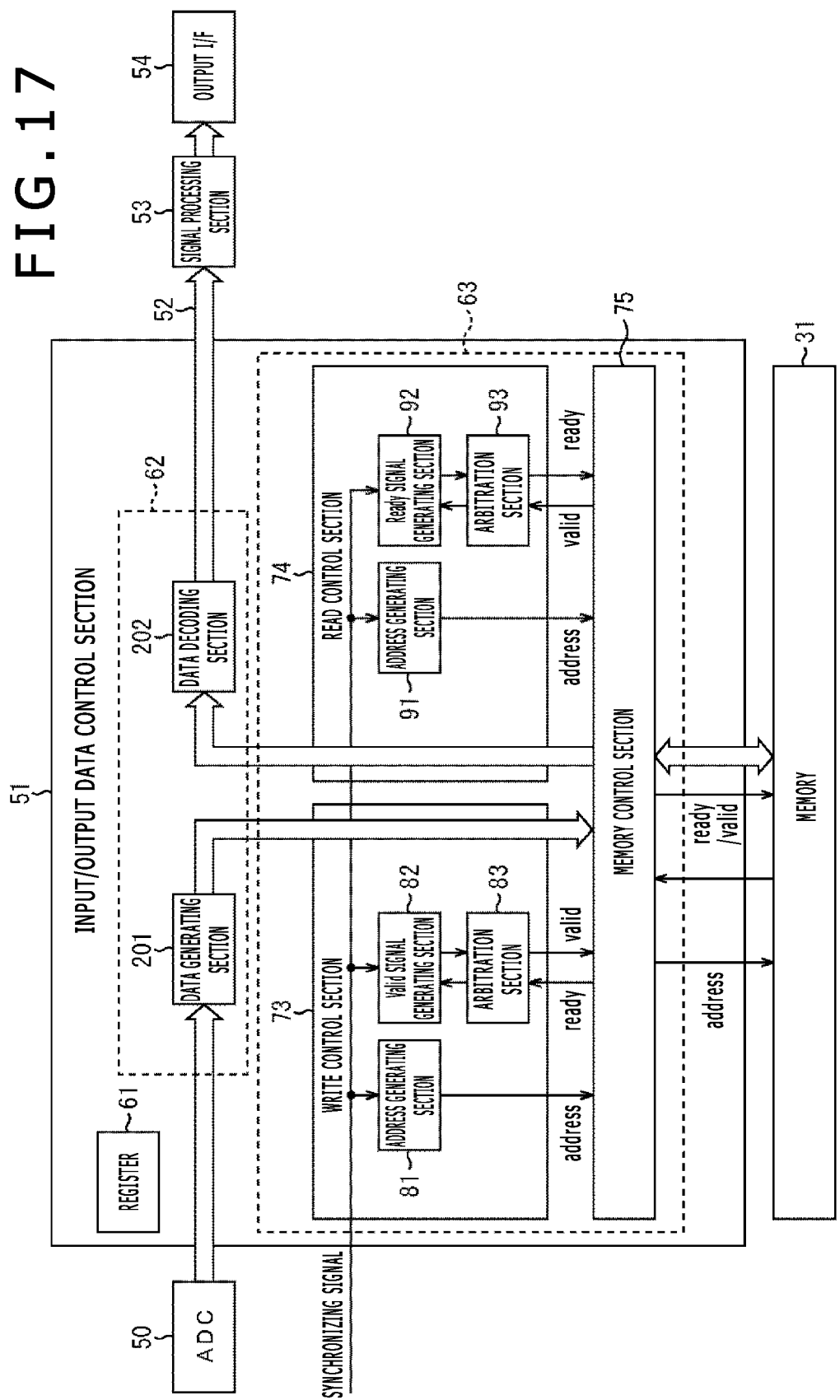
FIG. 17 is a block diagram depicting a fifth configuration example of the input/output data control section 51.

FIG. 17 is a block diagram depicting another configuration example of the input/output data control section 51 in FIG. 3.

Specifically, FIG. 17 is a block diagram depicting a fifth configuration example of the input/output data control section 51.

Of the components in the figure, those whose corresponding counterparts are found in FIG. 5 or 13 are designated by like reference numerals, and their explanations may be omitted hereunder where appropriate.

The input/output data control section 51 in FIG. 17 is the same as its counterpart in FIG. 5 in that the memory I/F 63 includes the write control section 73, the read control section 74, and the memory control section 75.

However, the input/output data control section 51 in FIG. 17 is different from its counterpart in FIG. 5 in that the data processing section 62 has a data generating section 201 and a data decoding section 202 replacing the data generating section 71 and the data decoding section 72 respectively.

The input/output data control section 51 in FIG. 17 further differs from its counterpart in FIG. 5 in that the write control section 73 has the arbitration section 83 in FIG. 13 and the read control section 74 has the arbitration section 93 in FIG. 13.

The data generating section 201 has the function of the data generating section 71 in FIG. 5 and the function of the data generating section 111 in FIG. 9.

The data decoding section 202 has the function of the data decoding section 72 in FIG. 5 and the function of the data decoding section 112 in FIG. 9.

Thus in addition to the normal function of performing normal memory access, the input/output data control section 51 in FIG. 17 has three more functions: a first function of performing dummy access-accompanied memory access in the same manner as the input/output data control section 51 in FIG. 5; a second function of writing and reading data in the same manner as the input/output data control section 51 in FIG. 9; and a third function of performing distributed memory access in the same manner as the input/output data control section 51 in FIG. 13.

Which of the normal function and of the first through the third functions is to be enabled may be determined by setting suitable information to the register 61 for example.

Of the normal function and the first through the third functions, the second function may be enabled concurrently with another function.

(Sixth Configuration Example of Input/Output Data Control Section 51)

Figure 18:
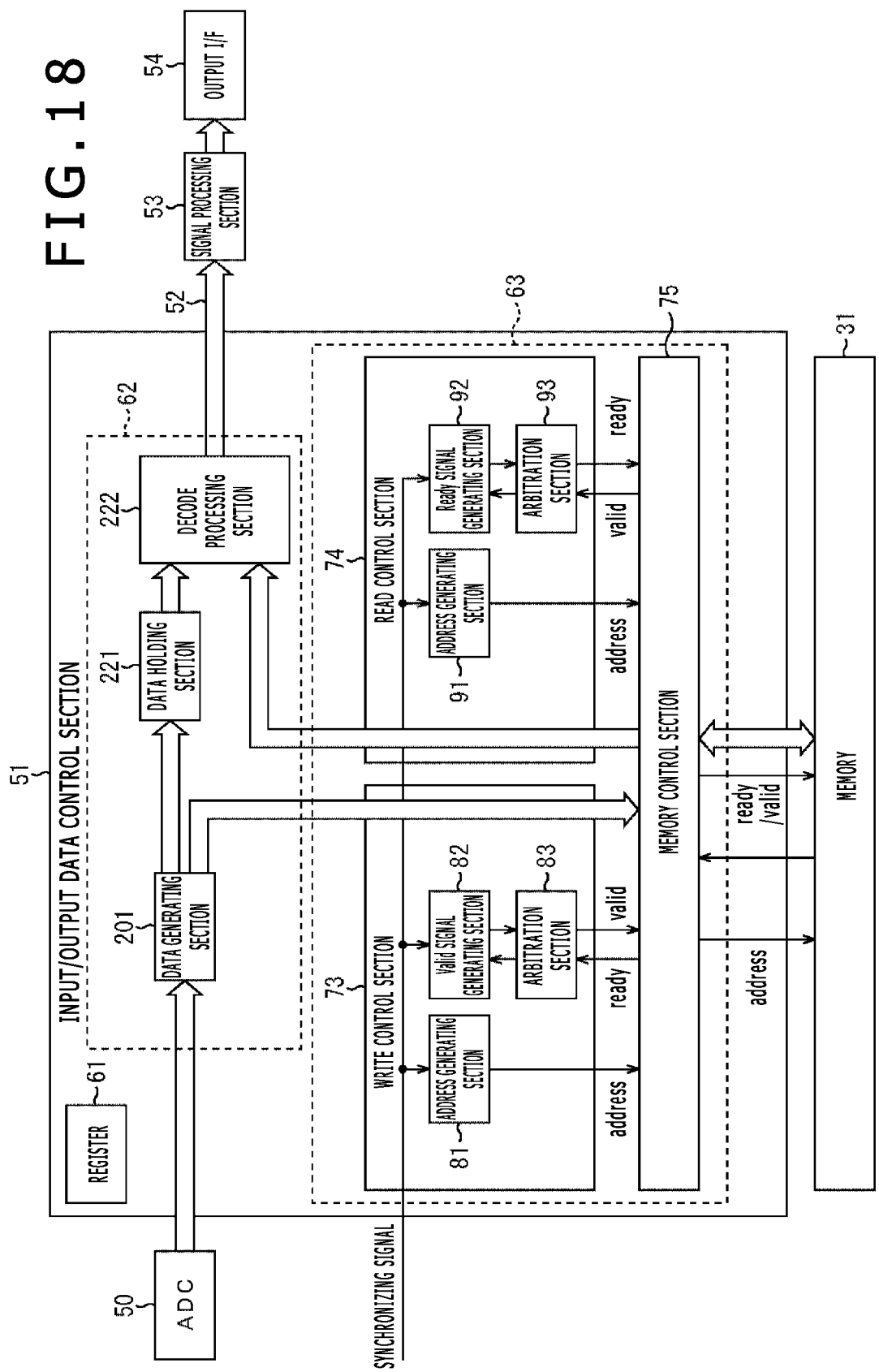
FIG. 18 is a block diagram depicting a sixth configuration example of the input/output data control section 51.

FIG. 18 is a block diagram depicting a sixth configuration example of the input/output data control section 51.

Of the components in the figure, those whose corresponding counterparts are found in FIG. 17 are designated by like reference numerals, and their explanations may be omitted hereunder where appropriate.

The input/output data control section 51 in FIG. 18 is the same as its counterpart in FIG. 17 in that the data processing section 62 includes the data generating section 201 and that the memory I/F 63 includes the write control section 73, the read control section 74, and the memory control section 75.

However, the input/output data control section 51 in FIG. 18 is different from its counterpart in FIG. 17 in that the data processing section 62 has a data holding section 221 and a decode processing section 222 replacing the data decoding section 202.

The data holding section 221 is configured in the same manner as the data holding section 121 in FIG. 11.

The decode processing section 222 has the same function as that of the data decoding section 72 in FIG. 5 and also has the same function as that of the decode processing section 122 in FIG. 11.

Thus like its counterpart in FIG. 17, the input/output data control section 51 in FIG. 18 has the normal function and the first through the third functions.

Also in the input/output data control section 51 in FIG. 18, as described above in reference to FIG. 11, the data holding section 221 and the decode processing section 222 may be configured to be smaller than the data decoding section 202 in FIG. 17. This contributes to making the image sensor smaller in size.

(Usage Examples of Image Sensor)

Figure 19:
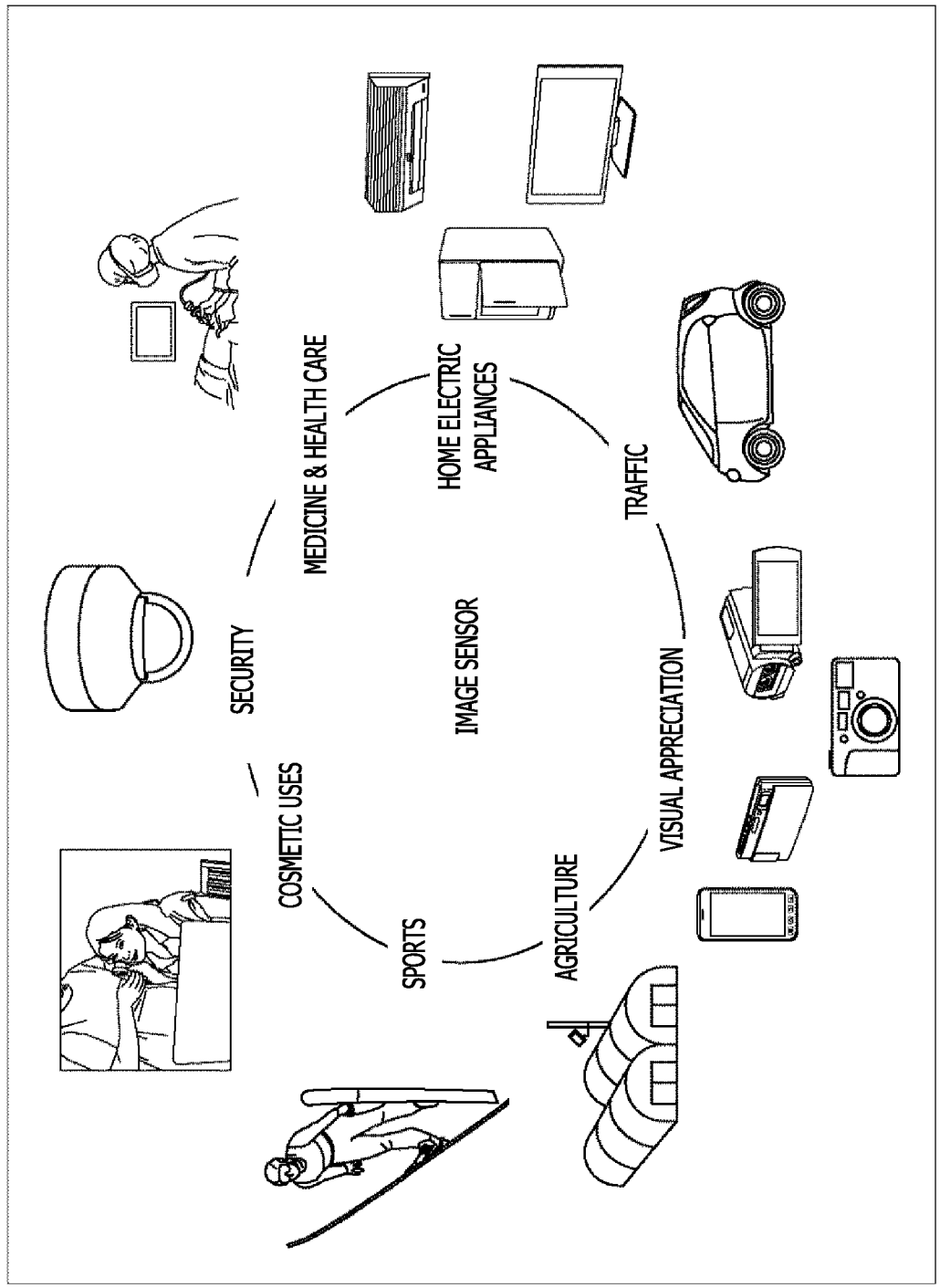
FIG. 19 is a schematic diagram depicting usage examples of images sensors.

FIG. 19 is a schematic diagram depicting usage examples of images sensors in FIG. 1.

The image sensor discussed above may be used in various electronic devices outlined below, such as those having diverse types of light including visible light, infrared light, ultraviolet radiation, or X-radiation sensed by the image sensor.

- Electronic devices that capture images for visual appreciation, such as digital cameras and camera function-equipped mobile devices.
- Traffic use electronic devices including onboard sensors that capture images of the front side, rear side, surroundings, and interior of a vehicle to ensure safe operations such as automated vehicle stop and to recognize the driver's status; surveillance cameras for monitoring passing vehicles and the roads on which they travel; and distance measurement sensors for measuring the distance between vehicles.
- Electronic devices that capture images of users' gestures to operate home electric appliances such as TV sets, refrigerators, and air conditioners in a manner reflecting the gestures.
- Electronic devices for medicine and health care uses, such as endoscopes and instruments that capture images of blood vessels using received infrared radiation.
- Electronic devices for security uses, such as surveillance cameras for crime prevention and cameras for personal authentication.
- Electronic devices for cosmetic uses, such as skin measuring instruments and microscopes for capturing images of the scalp.
- Electronic devices for sports uses, such as action cameras and wearable cameras.
- Electronic devices for agriculture uses, such as surveillance cameras for monitoring fields and crops.

(Digital Camera that Uses Image Sensor)

Figure 20:
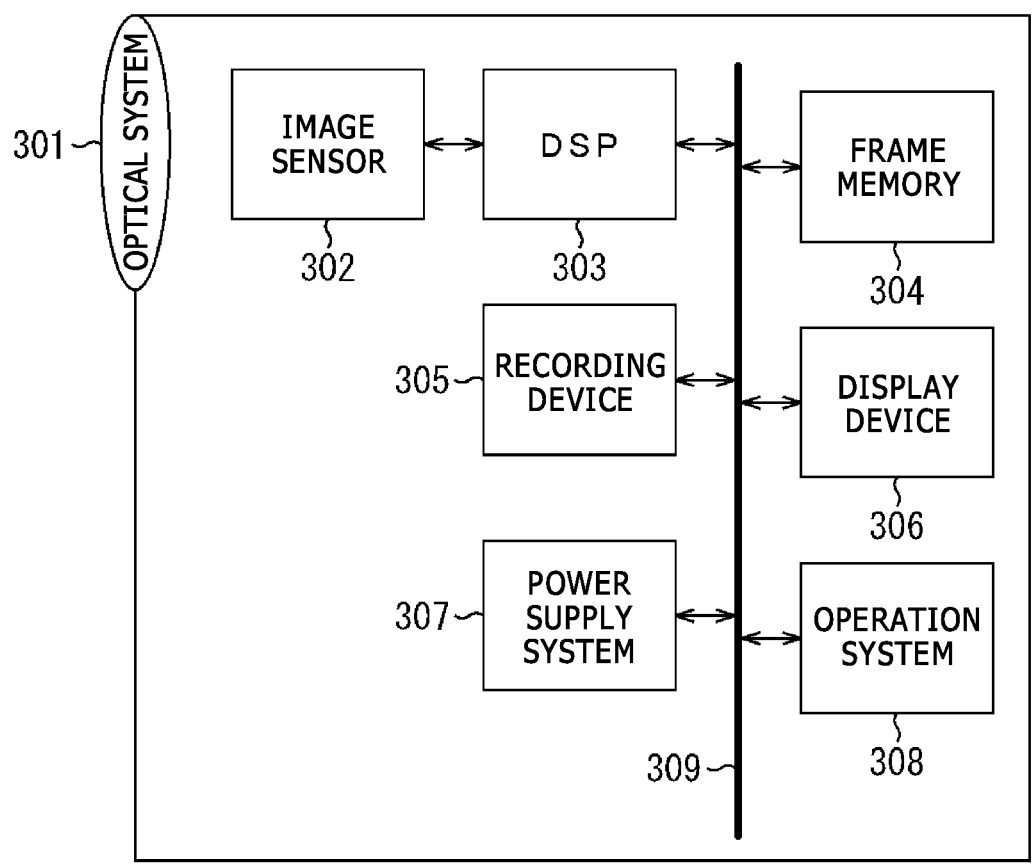
FIG. 20 is a block diagram depicting a typical configuration example of a digital camera as an electronic device that uses an image sensor.

FIG. 20 is a block diagram depicting a typical configuration example of a digital camera as an electronic device that uses the image sensor in FIG. 1.

The digital camera is capable of capturing both still images and moving images.

The digital camera in FIG. 20 includes an optical system 301, an image sensor 302, a digital signal processor (DSP) 303, a frame memory 304, a recording device 305, a display device 306, a power supply system 307, an operation system 308, and a bus line 309. In the digital camera, the components ranging from the DSP 303 to the operation system 308 are interconnected via the bus line 309.

The optical system 301 focuses external light onto the image sensor 302.

The image sensor 302 is configured in the same manner as the image sensor in FIG. 1. The image sensor 302 receives light from the optical system 301 and subjects the received light to photoelectric conversion to output image data as an electrical signal.

The DSP 303 performs necessary signal processing on the image data output from the image sensor 302.

The frame memory 304 temporarily holds, one frame at a time, the image data having undergone the signal processing by the DSP 303.

The recording device 305 records the image data of still or moving images captured by the image sensor 302 onto a recording medium such as a semiconductor memory or a hard disk.

The display device 306 is made of a panel type display device such as a liquid crystal panel or an organic electroluminescence (EL) panel. The display device 306 displays an image (moving or still image) reflecting the image data stored in the frame memory 304.

The power supply system 307 supplies necessary power to the components ranging from the image sensor 302 to the display device 306 as well as to the operation system 308.

The operation system 308, in accordance with operations performed by the user, outputs operation commands regarding the functions provided by the digital camera.

(Explanation of Computer to which Present Technology is Applied)

A series of steps or processes performed by the input/output data control section 51 may be executed either by hardware or by software. Where a software-based series of processing is to be carried out, a program constituting the software is installed into a computer such as a microcomputer. That computer functions as the input/output data control section 51.

Figure 21:
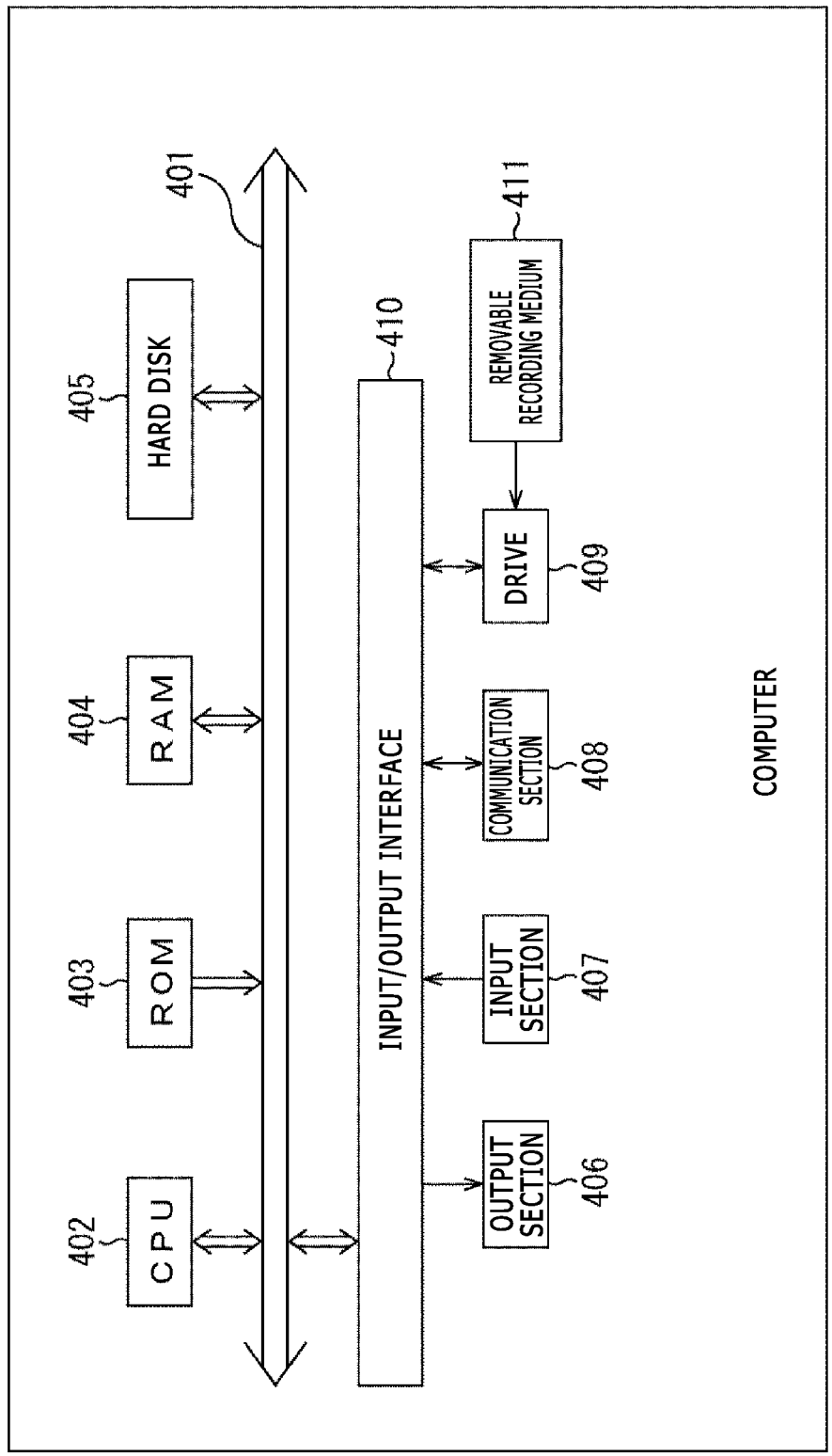
FIG. 21 is a block diagram depicting a typical configuration example of a computer to which the present technology is applied.

FIG. 21 is a block diagram depicting a typical configuration example of a computer into which the program for executing the series of processing with the input/output data control section 51 is installed.

The program may be recorded beforehand on a hard disk 405 or a read-only memory (ROM) 403 serving as a built-in recording medium of the computer.

Alternatively, the program may be stored (recorded) on a removable recording medium 411. The removable recording medium 411 may be offered as so-called packaged software. Variations of the removable recording medium 411 include a flexible disc, a compact disc (CD)-ROM, a magneto optical (MO) disc, a digital versatile disc (DVD), a magnetic disc, and a semiconductor memory, for example.

The program, besides being installed into the computer from the removable recording medium 411 as described above, may be downloaded to the computer via a communication network or a broadcasting network before being installed onto the built-in hard disk 405. For example, the program may be transferred from a download site to the computer either wirelessly via a digital broadcast satellite or in wired fashion via a network such as a local area network (LAN) or the Internet.

The computer incorporates a central processing unit (CPU) 402. The CPU 402 is connected with an input/output interface 410 via a bus 401.

Commands are input to the CPU 402 via the input/output interface 410 from an input section 407 operated by the user, for example. In accordance with the input commands, the CPU 402 executes the program stored in the ROM 403. Alternatively, the CPU 402 may load the program from the hard disk 405 into a random access memory (RAM) 404 and execute the loaded program.

In this manner, the CPU 402 performs the steps or processes in the above-described flowcharts or causes the components configured in the above-explained block diagrams to perform their processes. The CPU 402 causes the result of the processing to be output from an output section 406 or transmitted from a communication section 408 via the input/output interface 410 or written to the hard disk 405 as needed, for example.

The input section 407 is made up of a keyboard, a mouse, and a microphone, for example. The output section 406 is formed by a liquid crystal display (LCD) and speakers, for example.

In this description, the steps or processes performed by the computer in accordance with the program need not proceed chronologically as depicted in the flowcharts. That is, these steps or processes may also include steps or processes that are conducted parallelly or individually (e.g., in parallel or object-oriented fashion).

The program may be processed by a single computer (processor) or by multiple computers on a distributed basis.

The present technology is not limited to the embodiment discussed above and may also be implemented in diverse variations so far as they are within the scope of the appended claims or the equivalents thereof.

For example, the present technology may be implemented regardless of the number of the pixels constituting the pixel array section 11.

It was explained above that the present technology is applied to the image sensor performing parallel-column AD conversion. In another example, the present technology may also be applied to image sensors that perform AD conversion other than parallel-column AD conversion. For example, this technology may be applied to image sensors performing area AD conversion, i.e., a process that involves providing an ADC for each predetermined area so that the ADC for each area is in charge of the AD conversion of pixel signals from the pixels inside the corresponding area. In this case, the group of pixel data described above in reference to FIG. 9 is the result of AD conversion obtained simultaneously from each area.

The advantageous effects stated in this description are only examples and not limitative of the present technology that may also provide other advantages.

The present technology may be configured preferably as follows:

(1)

An image sensor including:

a pixel array section configured to perform photoelectric conversion and have multiple pixels arrayed therein to output a pixel signal each;

a storage section configured to store the pixel signals output from the pixel array section; and a control section configured to control writing and reading of the pixel signals to and from the storage section, in which the control section writes and reads dummy data to and from the storage section in a non-access period other than the period in which the storage section is accessed for the writing and reading of the pixel signals thereto and therefrom.

(2)

A processing method for use with an image sensor including a pixel array section configured to perform photoelectric conversion and have multiple pixels arrayed therein to output a pixel signal each, a storage section configured to store the pixel signals output from the pixel array section, and a control section configured to control writing and reading of the pixel signals to and from the storage section, the processing method including:

a step of causing the control section to write and read dummy data to and from the storage section in a non-access period other than the period in which the storage section is accessed for the writing and reading of the pixel signals thereto and therefrom.

(3)

An electronic device including:

an optical system configured to focus light; and an image sensor configured to receive light and capture an image, in which the image sensor includes a pixel array section configured to perform photoelectric conversion and have multiple pixels arrayed therein to output a pixel signal each, a storage section configured to store the pixel signals output from the pixel array section, and a control section configured to control writing and reading of the pixel signals to and from the storage section, and the control section writes and reads dummy data to and from the storage section in a non-access period other than the period in which the storage section is accessed for the writing and reading of the pixel signals thereto and therefrom.

(4)

An image sensor including:

a pixel array section configured to perform photoelectric conversion and have multiple pixels arrayed therein to output a pixel signal each;

a storage section configured to store the pixel signals output from the pixel array section; and a control section configured to control writing and reading of the pixel signals to and from the storage section, in which the control section encodes the pixel signals in such a manner as to vary the pixel signals, before writing the encoded pixel signals to the storage section.

(5)

The image sensor as stated in paragraph (4) above, in which the control section is configured to encode the pixel signals by performing an exclusive-OR between the pixel signals and a predetermined pattern.

(6)

The image sensor as stated in paragraph (4) or (5) above, in which the control section is configured to read the encoded pixel signals from the storage section and decode the encoded pixel signals into the initial pixel signals.

(7)

The image sensor as stated in paragraph (6) above, in which the control section is configured to encode the pixel signals by performing an exclusive-OR between the pixel signals and a predetermined pattern, and the control section is configured to decode the encoded pixel signals by performing an exclusive-OR between the encoded pixel signals and the predetermined pattern.

(8)

The image sensor as stated in paragraph (7) above, in which the predetermined pattern is the same for a group of a predetermined number of the pixel signals, the control section is configured to encode each group of the pixel signals in synchronism with decoding of another group of the encoded pixel signals, the control section is configured to cause a data holding section to hold, one bit at a time, the predetermined pattern used for the encoding, and the control section is configured to perform the decoding using the bit held in the data holding section.

(9)

A processing method for use with an image sensor including a pixel array section configured to perform photoelectric conversion and have multiple pixels arrayed therein to output a pixel signal each, a storage section configured to store the pixel signals output from the pixel array section, and a control section configured to control writing and reading of the pixel signals to and from the storage section, the processing method including:

a step of causing the control section to encode the pixel signals in such a manner as to vary the pixel signals, before writing the encoded pixel signals to the storage section.

(10)

An electronic device including:

an optical system configured to focus light; and an image sensor configured to receive light and capture an image, in which the image sensor includes a pixel array section configured to perform photoelectric conversion and have multiple pixels arrayed therein to output a pixel signal each, a storage section configured to store the pixel signals output from the pixel array section, and a control section configured to control writing and reading of the pixel signals to and from the storage section, and the control section encodes the pixel signals in such a manner as to vary the pixel signals, before writing the encoded pixel signals to the storage section.

(11)

An image sensor including:

a pixel array section configured to perform photoelectric conversion and have multiple pixels arrayed therein to output a pixel signal each;

a storage section configured to store the pixel signals output from the pixel array section; and a control section configured to control writing and reading of the pixel signals to and from the storage section in such a manner that access operations to the storage section for the writing and reading of the pixel signals thereto and therefrom are uniformly distributed.

(12)

A processing method for use with an image sensor including a pixel array section configured to perform photoelectric conversion and have multiple pixels arrayed therein to output a pixel signal each, a storage section configured to store the pixel signals output from the pixel array section, and a control section configured to control writing and reading of the pixel signals to and from the storage section, the processing method including:

a step of causing the control section to control the writing and reading of the pixel signals to and from the storage section in such a manner that access operations to the storage section for the writing and reading of the pixel signals thereto and therefrom are uniformly distributed.

(13)

An electronic device including:

an optical system configured to focus light; and an image sensor configured to receive light and capture an image, in which the image sensor includes a pixel array section configured to perform photoelectric conversion and have multiple pixels arrayed therein to output a pixel signal each, a storage section configured to store the pixel signals output from the pixel array section, and a control section configured to control writing and reading of the pixel signals to and from the storage section in such a manner that access operations to the storage section for the writing and reading of the pixel signals thereto and therefrom are uniformly distributed.

REFERENCE SIGNS LIST

10 Substrate
11 Pixel array section
20 Substrate
21 Peripheral circuits

30 Substrate
31 Memory
40 Substrate
50 ADC
51 Input/output data control section
52 Data path
53 Signal processing section
54 Output I/F
61 Register
62 Data processing section
63 Memory I/F
71 Data generating section
72 Data decoding section
73 Write control section
74 Read control section
75 Memory control section
81 Address generating section
82 Valid signal generating section
83 Arbitration section
91 Address generating section
92 Ready signal generating section
93 Arbitration section
111 Data generating section
112 Data decoding section
121 Data holding section
122 Decode processing section
201 Data generating section
202 Data decoding section
221 Data holding section
222 Decode processing section
301 Optical system
302 Image sensor
303 DSP
304 Frame memory
305 Recording device
306 Display device
307 Power supply system
308 Operation system
309 Bus line
401 Bus
402 CPU
403 ROM
404 RAM
405 Hard disk
406 Output section
407 Input section
408 Communication section
409 Drive
410 Input/output interface
411 Removable recording medium

What is claimed is:

1. An image sensor, comprising:
a pixel array section configured to perform photoelectric conversion and having a plurality of pixels arrayed in lines therein to output a pixel signal for each line in the array of pixels;
a storage section configured to store the pixel signals as pixel data output from the pixel array section; and
a control section configured to control writing and reading of the pixel data to and from the storage section,
wherein the control section writes and reads dummy data to and from the storage section in a non-access period other than a period in which the storage section is accessed for the writing and reading of the pixel data thereto and therefrom.

2. The image sensor according to claim 1, wherein the non-access period and the period in which the storage section is accessed are substantially a same amount of time.

3. The image sensor according to claim 2, wherein an amount of the pixel data is substantially the same as an amount of the dummy data for each line in the array of pixels.

4. A processing method for use with an image sensor including:
a pixel array section configured to perform photoelectric conversion and having a plurality of pixels arrayed in lines therein to output a pixel signal for each line in the array of pixels, a storage section configured to store the pixel signals as pixel data output from the pixel array section, and
a control section configured to control writing and reading of the pixel data to and from the storage section,
the processing method comprising:
a step of causing the control section to write and read dummy data to and from the storage section in a non-access period other than a period in which the storage section is accessed for the writing and reading of the pixel data thereto and therefrom.

5. The processing method according to claim 4, wherein the non-access period and the period in which the storage section is accessed are substantially a same amount of time.

6. The processing method according to claim 5, wherein an amount of the pixel data is substantially the same as an amount of the dummy data for each line in the array of pixels.

7. An electronic device, comprising:
an optical system configured to focus light; and
an image sensor configured to receive light and capture an image,
wherein the image sensor includes:
a pixel array section configured to perform photoelectric conversion and having a plurality of pixels arrayed in lines therein to output a pixel signal for each line in the array of pixels,
a storage section configured to store the pixel signals as pixel data output from the pixel array section, and
a control section configured to control writing and reading of the pixel data to and from the storage section, and
the control section writes and reads dummy data to and from the storage section in a non-access period other than a period in which the storage section is accessed for the writing and reading of the pixel data thereto and therefrom.

8. The electronic device according to claim 7, wherein the non-access period and the period in which the storage section is accessed are substantially a same amount of time.

9. The electronic device according to claim 8, wherein an amount of the pixel data is substantially the same as an amount of the dummy data for each line in the array of pixels.

* * * * *